United States Patent
Kang et al.

(10) Patent No.: US 11,296,766 B2
(45) Date of Patent: Apr. 5, 2022

(54) METHOD FOR REPORTING CHANNEL STATE INFORMATION IN WIRELESS COMMUNICATION SYSTEM AND DEVICE THEREFOR

(71) Applicant: LG Electronics Inc., Seoul (KR)

(72) Inventors: Jiwon Kang, Seoul (KR); Hyungtae Kim, Seoul (KR); Jonghyun Park, Seoul (KR); Haewook Park, Seoul (KR); Kilbom Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 81 days.

(21) Appl. No.: 16/621,618

(22) PCT Filed: Jun. 14, 2018

(86) PCT No.: PCT/KR2018/006729
§ 371 (c)(1),
(2) Date: Dec. 11, 2019

(87) PCT Pub. No.: WO2018/230975
PCT Pub. Date: Dec. 20, 2018

(65) Prior Publication Data
US 2020/0204239 A1      Jun. 25, 2020

Related U.S. Application Data

(60) Provisional application No. 62/519,177, filed on Jun. 14, 2017.

(51) Int. Cl.
*H03D 3/22* (2006.01)
*H04B 7/06* (2006.01)
(Continued)

(52) U.S. Cl.
CPC ......... *H04B 7/0626* (2013.01); *H04B 7/0417* (2013.01); *H04B 7/0456* (2013.01);
(Continued)

(58) Field of Classification Search
CPC .. H04B 7/0626; H04B 7/0417; H04B 7/0456; H04B 7/0632; H04B 7/0634;
(Continued)

(56) References Cited

U.S. PATENT DOCUMENTS 8,774,037 B2 *   7/2014   Kim .................... H04B 7/0617
                                                                370/252
9,225,478 B2    12/2015   Chen et al.
(Continued)

FOREIGN PATENT DOCUMENTS

| KR | 101571639 | 11/2015 |
| KR | 20170059981 | 5/2017 |

OTHER PUBLICATIONS

EP Extended European Search Report in European Appln. No. 18818957.5, dated Feb. 16, 2021, 8 pages.
(Continued)

*Primary Examiner* — Helene E Tayong
(74) *Attorney, Agent, or Firm* — Fish & Richardson P.C.

(57) ABSTRACT

Systems and techniques for reporting channel state information (CSI) in a wireless communication system and a device therefor. Particularly, a method for reporting channel state information (CSI) of a terminal in a wireless communication system can include the steps of: measuring a CSI reference signal (CSI-RS) transmitted by means of multi-panels from a base station; and reporting CSI, which is generated on the basis of the CSI-RS measurement, to the base station. If the terminal receives, from the base station, configuration of a CSI report excluding a matrix index for phase calibration between panels, the CSI includes only a first matrix index, for wide-band (WB) panel compensation, and a second matrix index, for subband (SB) panel compensation, and can be calculated by means of the first matrix
(Continued)

index, the second matrix index and a particular matrix index associated with the phase calibration between the panels.

14 Claims, 13 Drawing Sheets

(51) Int. Cl.
*H04B 7/0417* (2017.01)
*H04B 7/0456* (2017.01)
*H04L 5/00* (2006.01)
*H04W 80/08* (2009.01)

(52) U.S. Cl.
CPC ......... *H04B 7/0632* (2013.01); *H04B 7/0634* (2013.01); *H04B 7/0639* (2013.01); *H04L 5/0051* (2013.01); *H04W 80/08* (2013.01)

(58) Field of Classification Search
CPC .. H04B 7/0639; H04B 7/0691; H04B 7/0478; H04B 7/0695; H04B 7/088; H04B 7/065; H04B 7/0658; H04L 5/0051; H04W 80/08
USPC ........................................................ 375/329
See application file for complete search history.

(56) References Cited

U.S. PATENT DOCUMENTS

| | | | | |
|---|---|---|---|---|
| 9,467,211 | B2* | 10/2016 | Hammarwall | ......... H04B 7/024 |
| 2012/0033759 | A1* | 2/2012 | Goransson | ............. H04B 17/24 |
| | | | | 375/296 |
| 2012/0051257 | A1* | 3/2012 | Kim | ..................... H04B 7/0617 |
| | | | | 370/252 |
| 2012/0201207 | A1* | 8/2012 | Liu | ....................... H04W 24/10 |
| | | | | 370/329 |

OTHER PUBLICATIONS

Huawei, HiSilicon, "Design and evaluation results for Type I codebook," R1-1708138, 3GPP TSG RAN WG1 Meeting #89, Hangzhou, China, dated May 15-19, 2017, 11 pages.

Ericsson, "Multi-panel codebooks," R1-1708695, 3GPP TSG-RAN WG1 #89, Hangzhou, China, dated May 15-19, 2017, 8 pages.

Samsung, "Type I CSI reporting," R1-1707961, 3GPP TSG RAN WG1 Meeting #89, Hangzhou, China, dated May 15-19, 2017, 10 pages.

* cited by examiner

[FIG. 1]
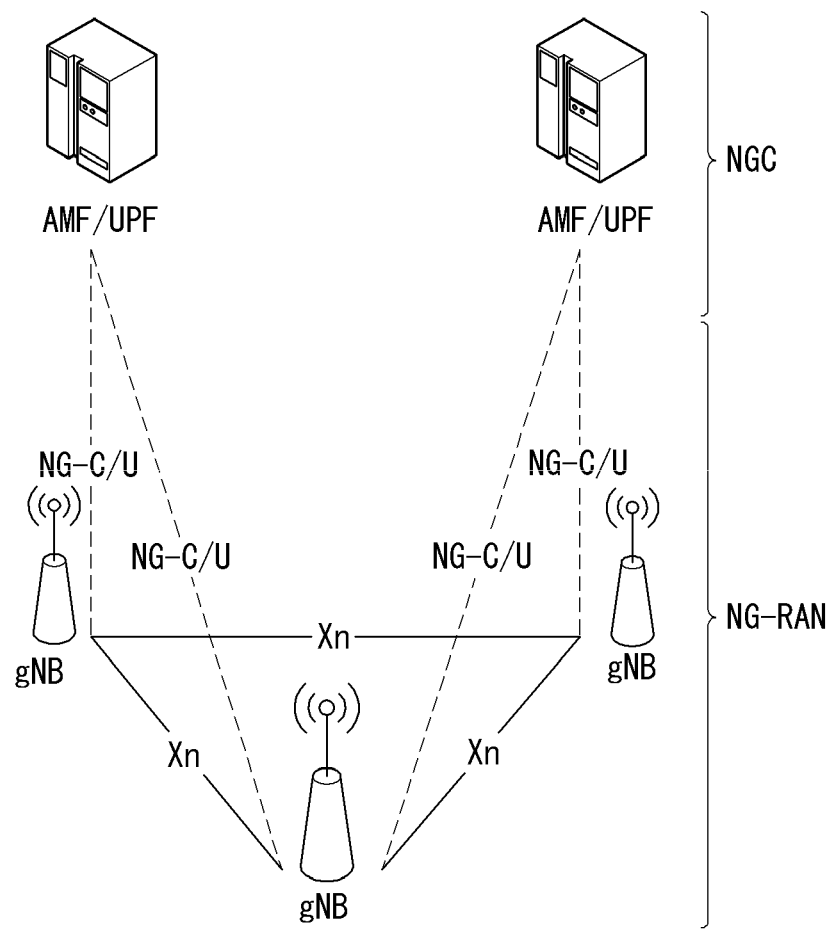

[FIG. 2]
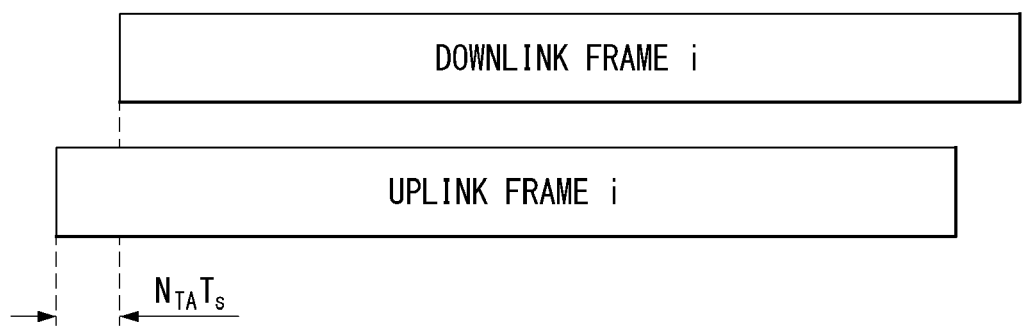

[FIG. 3]
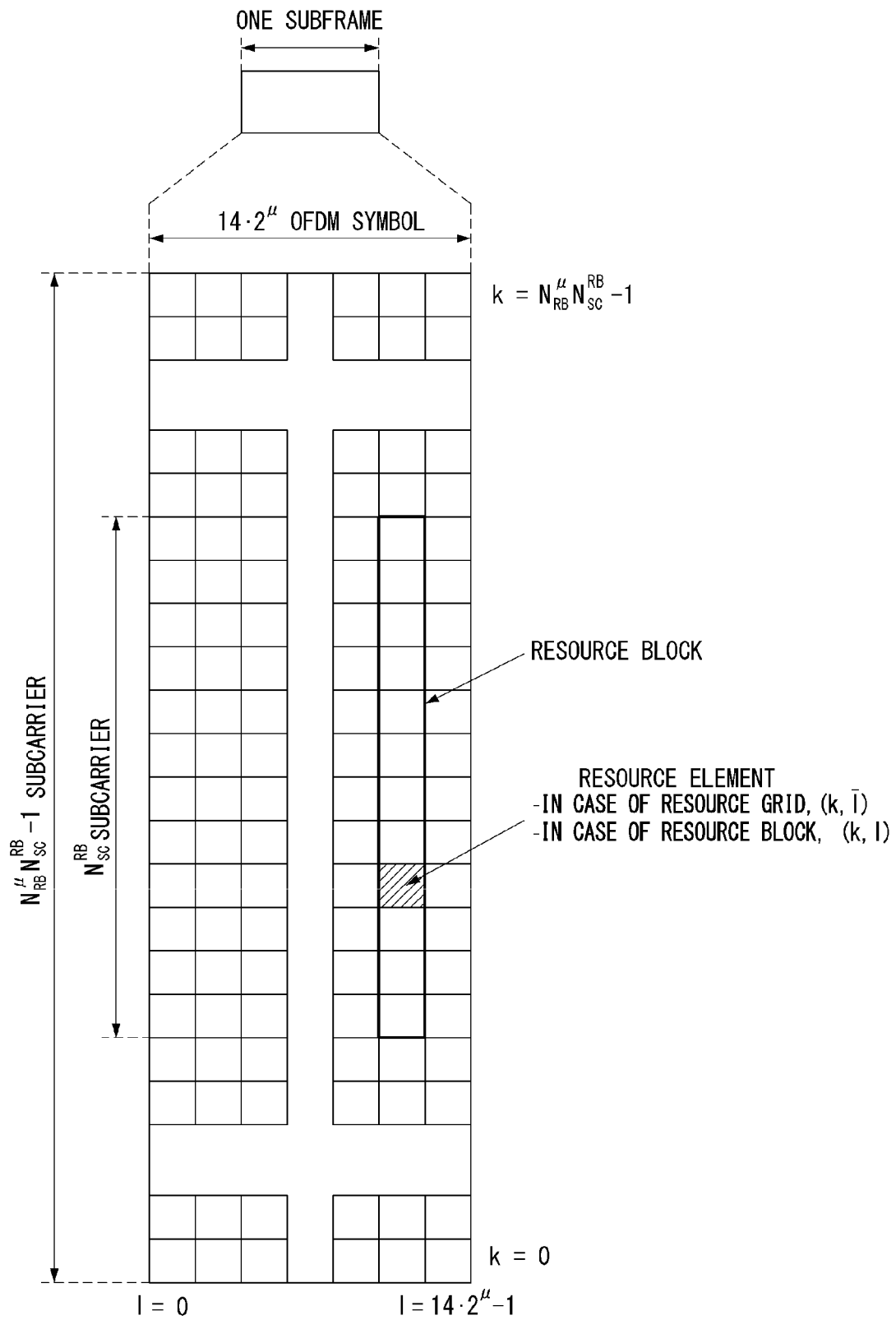

[FIG. 4]
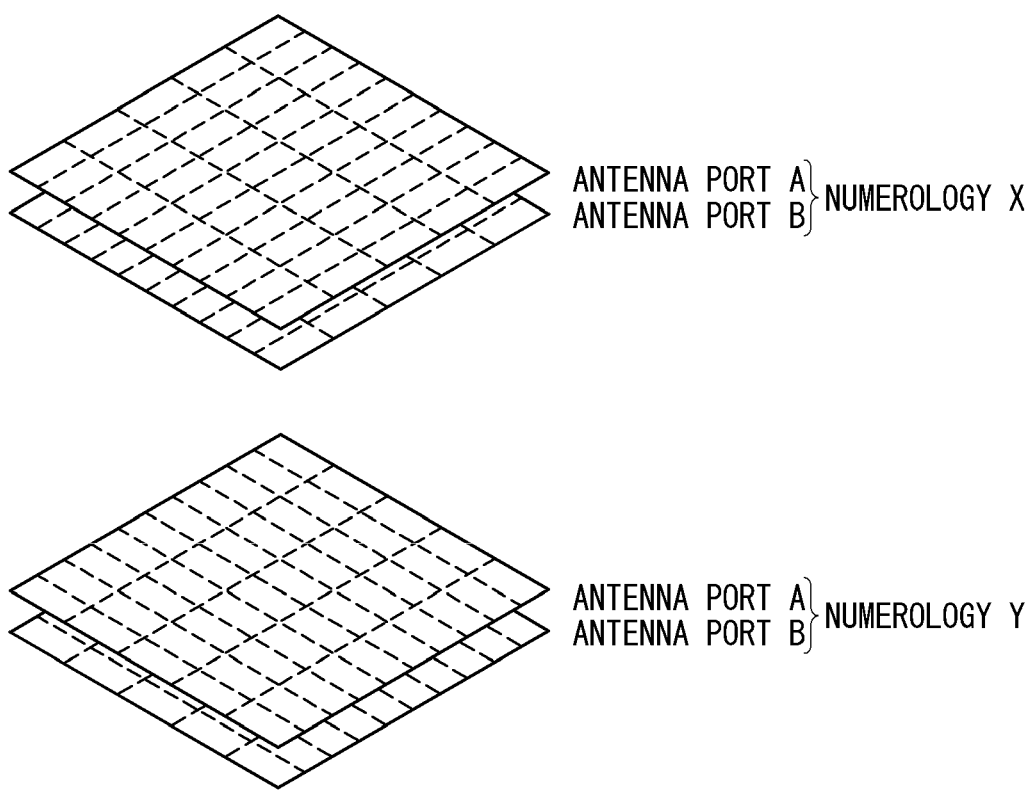

[FIG. 5]
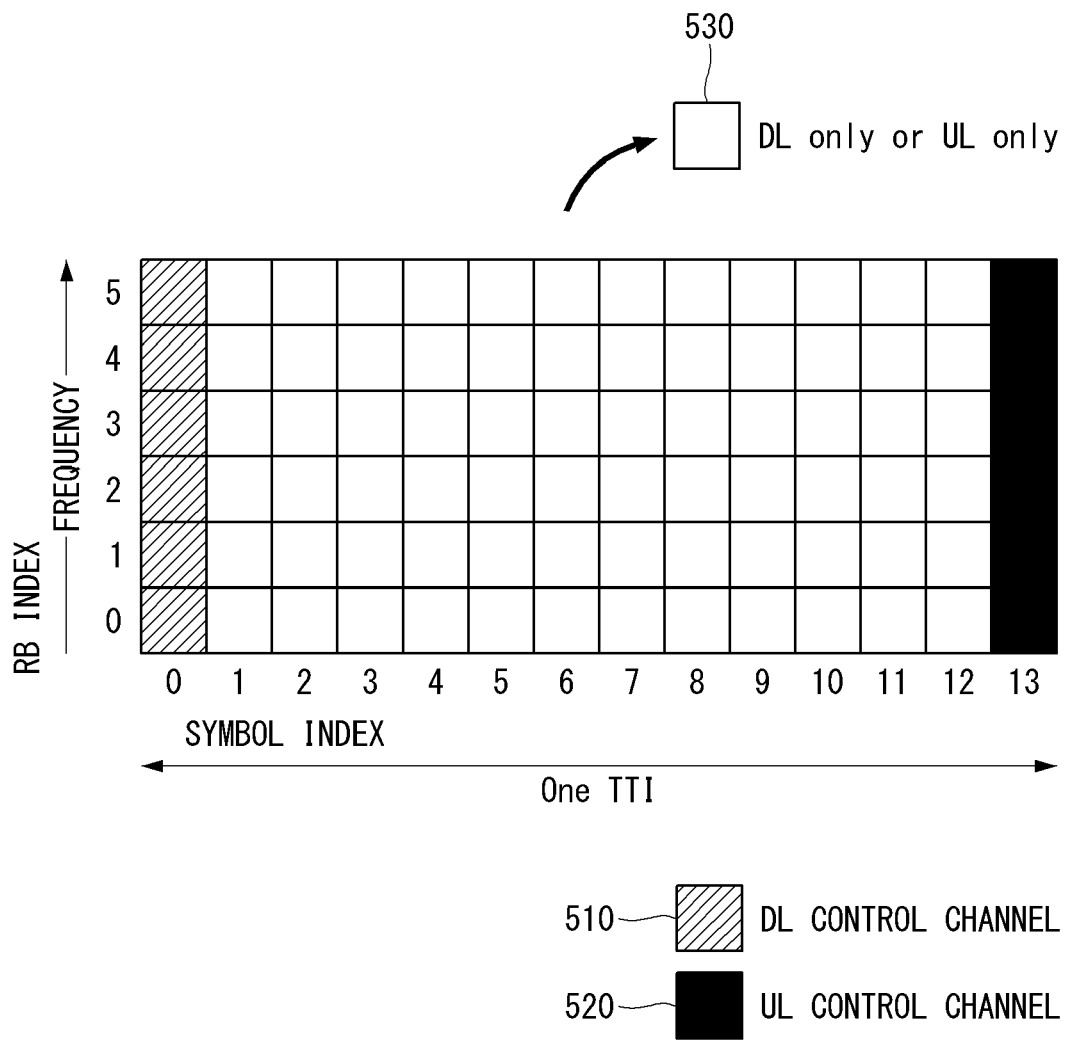

[FIG. 6]
(a)
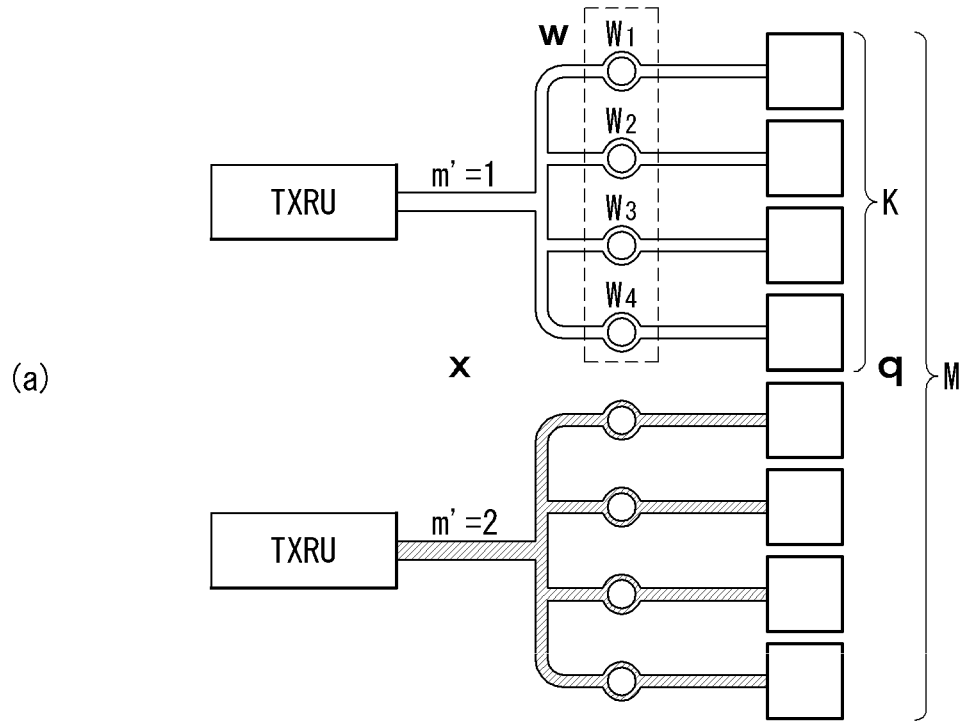
(b)
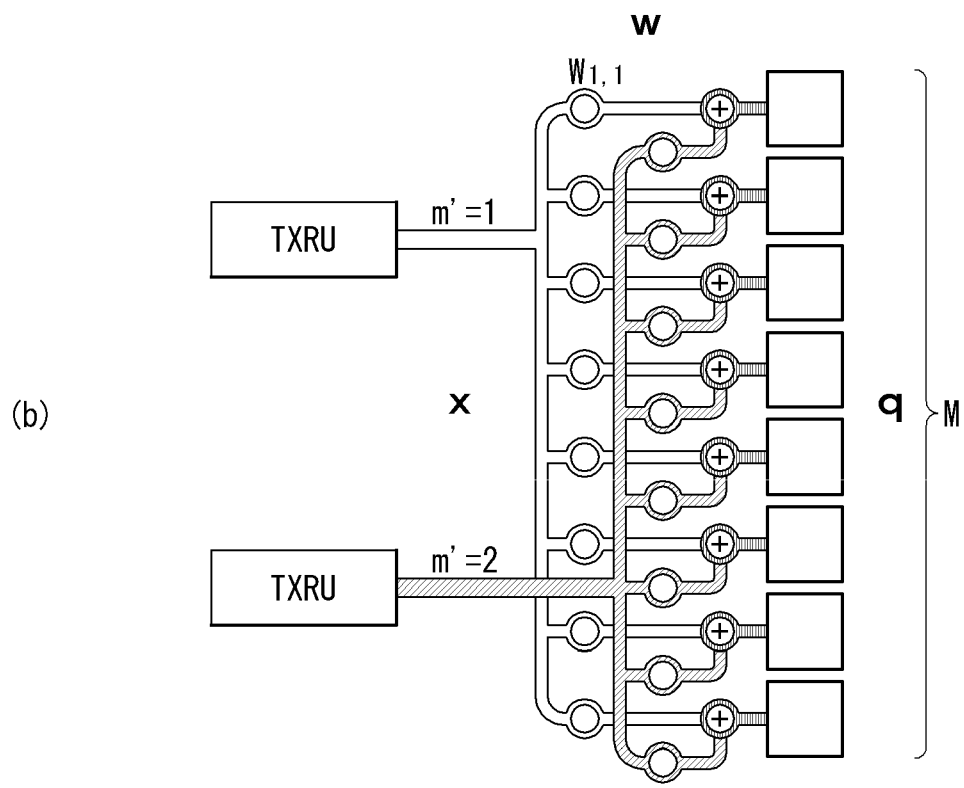

[FIG. 7]
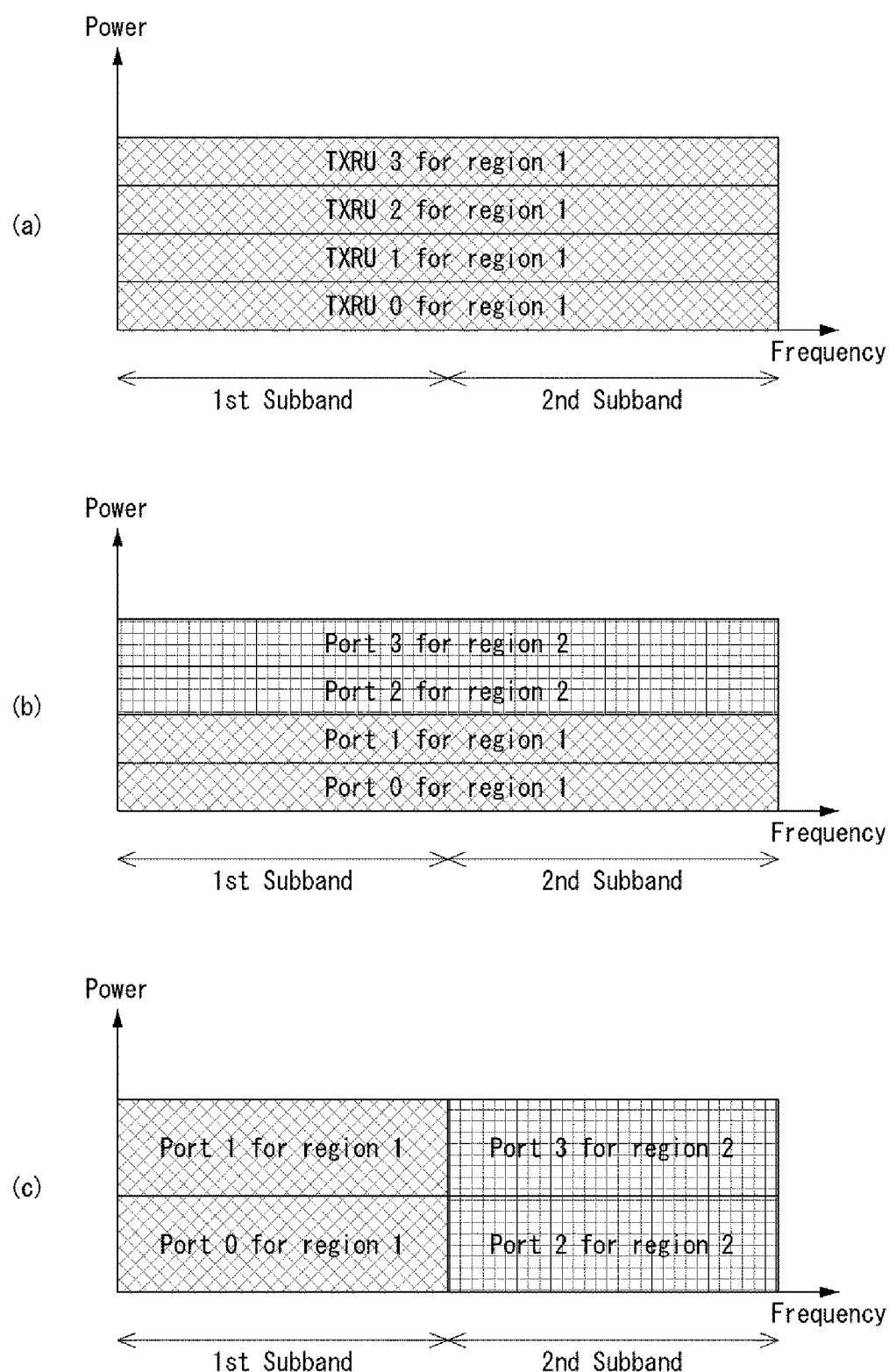

[FIG. 8]
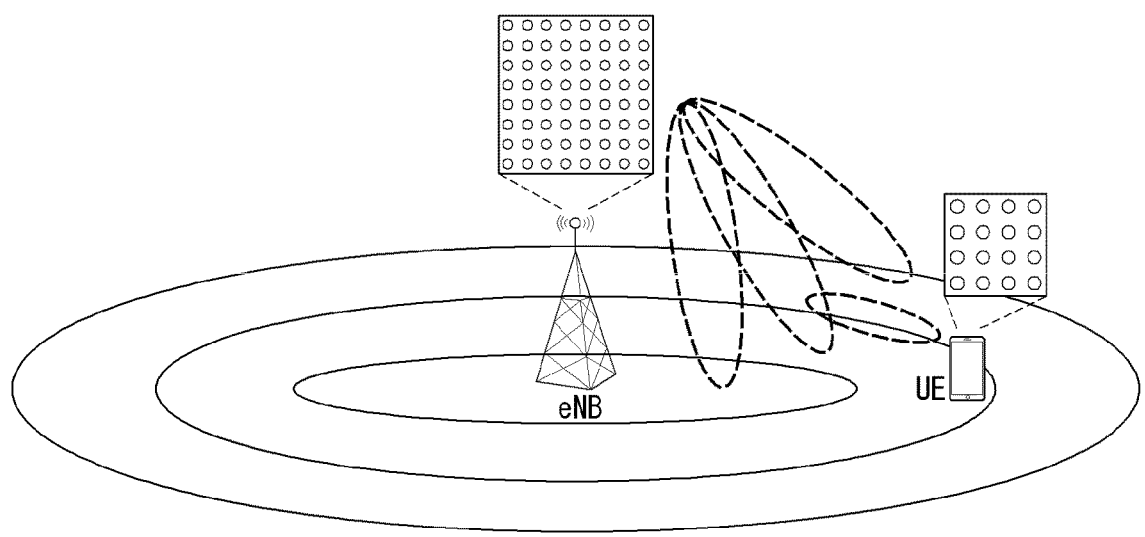

[FIG. 9]
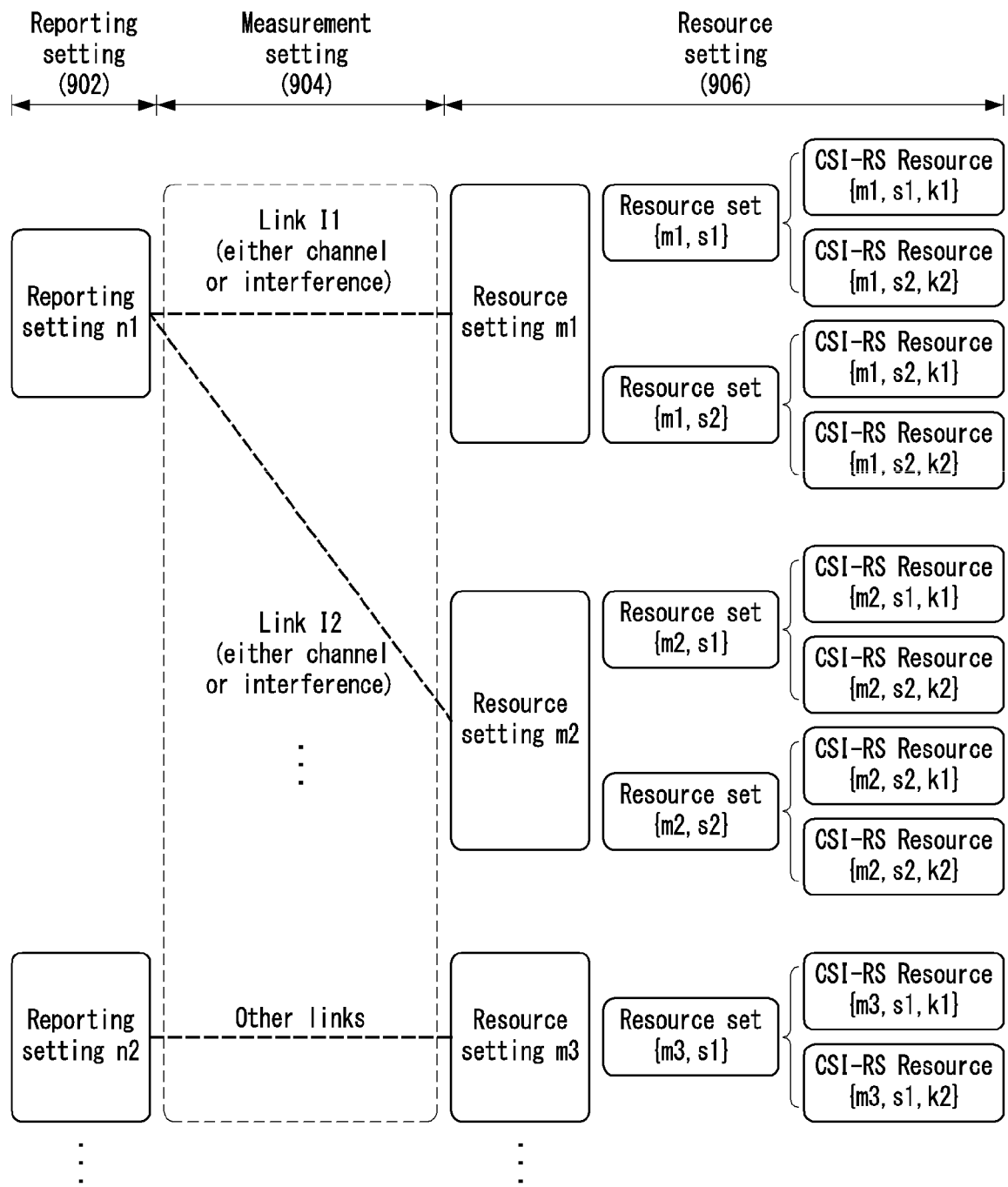

[FIG. 10]
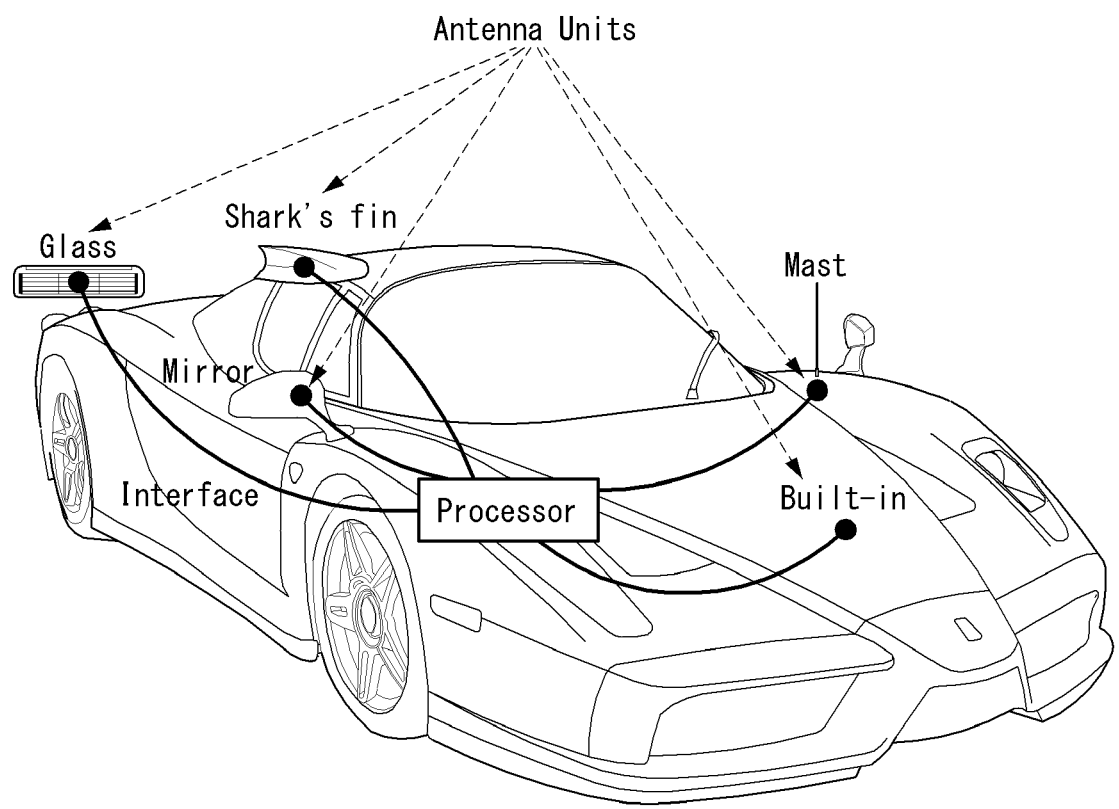

[FIG. 11]
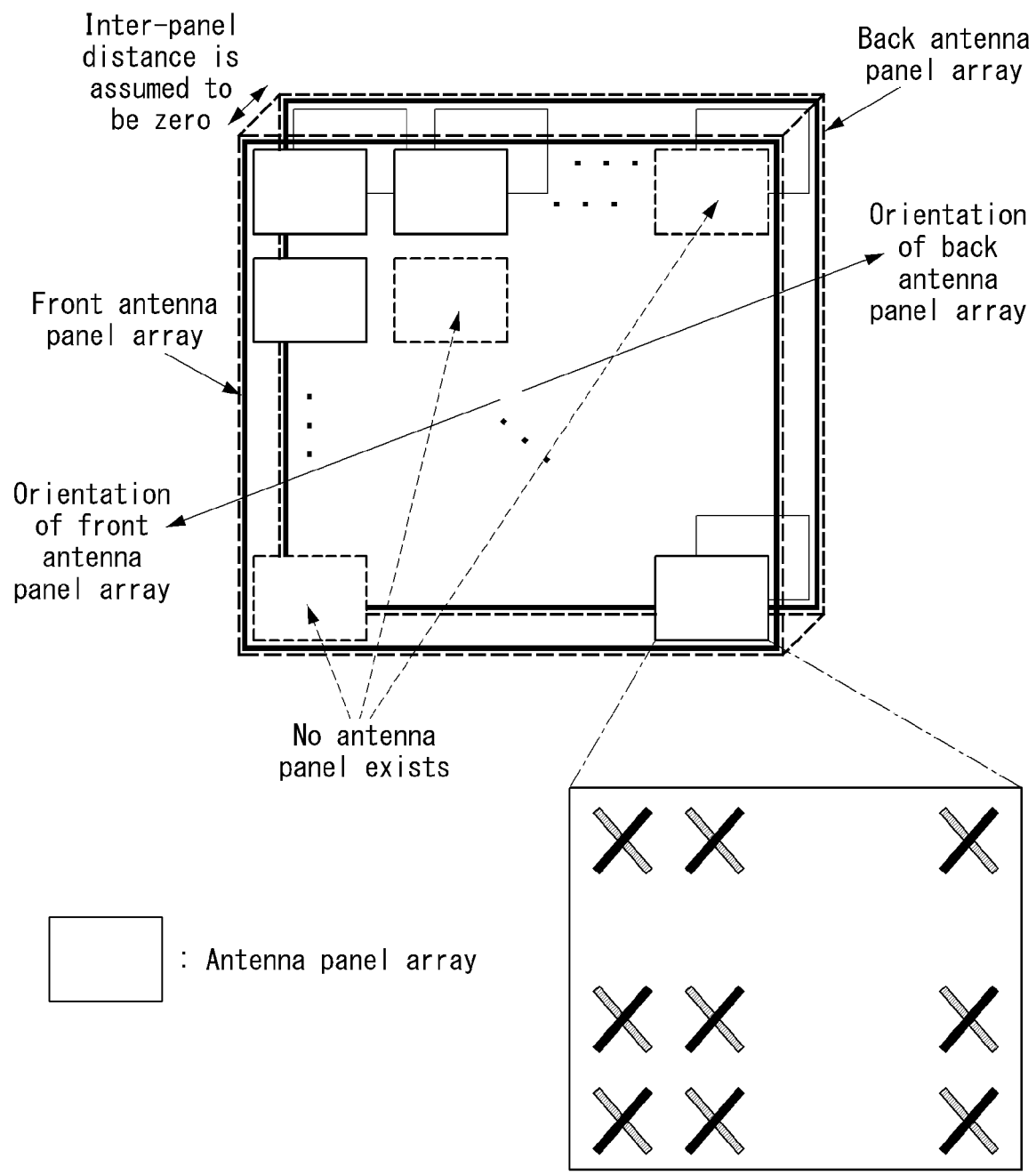

[FIG. 12]
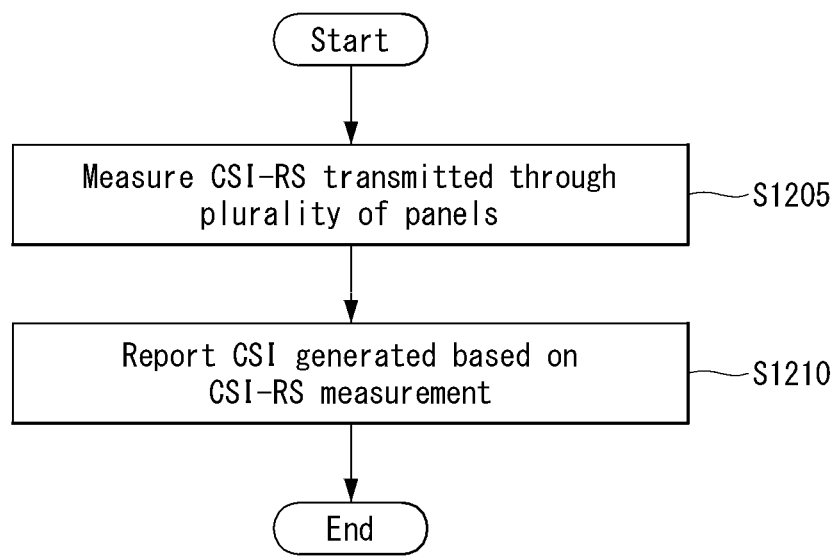
[FIG. 13]
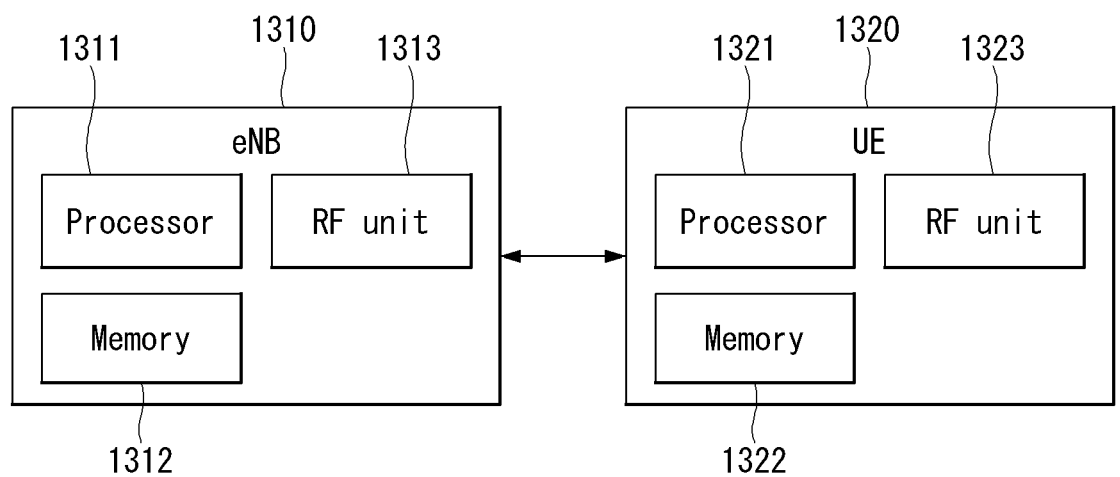

[FIG. 14]
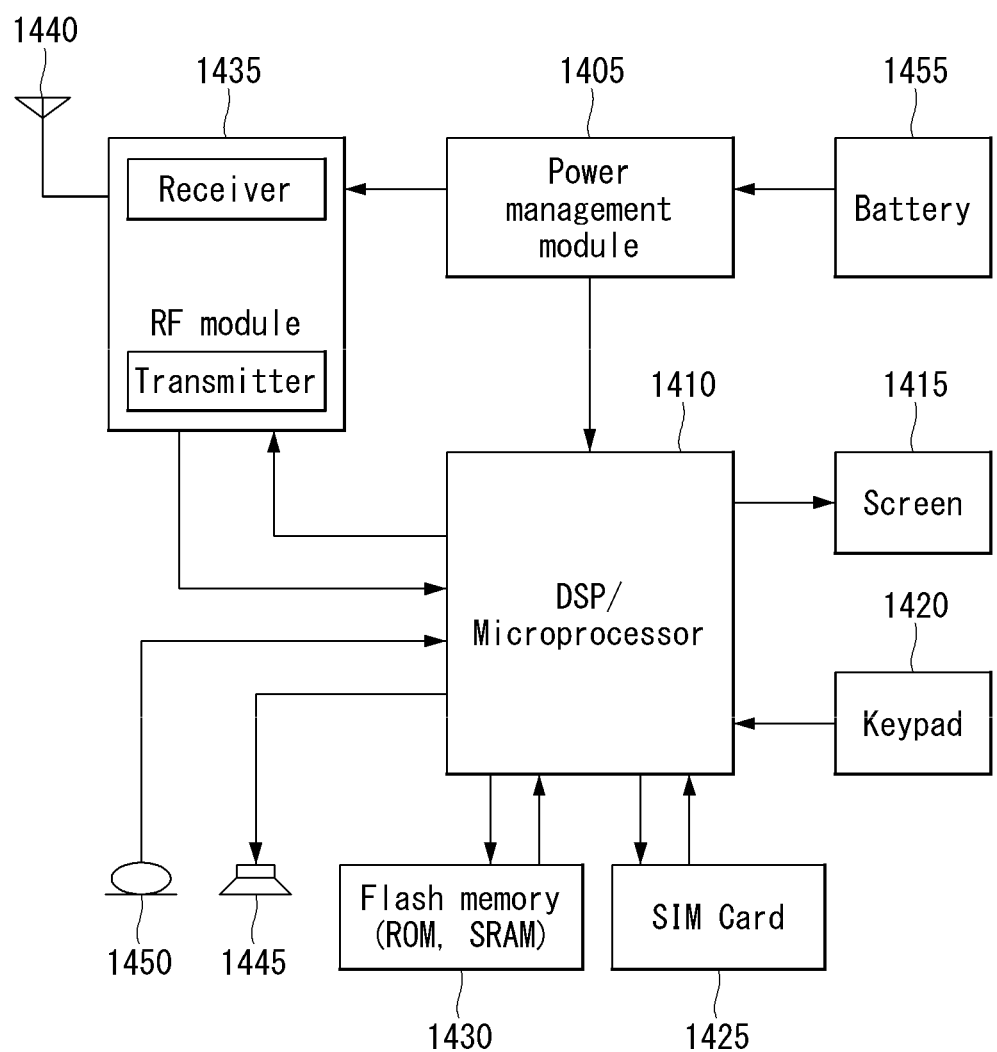

METHOD FOR REPORTING CHANNEL STATE INFORMATION IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2018/006729, filed on Jun. 14, 2018, which claims the benefit of U.S. Provisional Application No. 62/519,177, filed on Jun. 14, 2017, the contents of which are all hereby incorporated by reference.

TECHNICAL FIELD

The present disclosure relates to a wireless communication system and, more particularly, to a method for reporting, by a user equipment, channel state information and an apparatus supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

The disclosure proposes a method for transmitting and receiving channel state information (CSI) in a wireless communication system.

Furthermore, the disclosure proposes various report settings for CSI reporting/feedback. In particular, the disclosure proposes a new codebook and/or new report/feedback configuration (or information) for supporting beamforming through newly introduced multi-panels in a new RAT (NR) system.

Technical objects of the disclosure are not limited to the above-described technical objects, and other technical objects not described above may be evidently understood by those skilled in the art to which the disclosure pertains from the following description.

Technical Solution

In a method of reporting, by a user equipment, channel state information (CSI) in a wireless communication system according to an embodiment of the disclosure, the method may include measuring a CSI-reference signal (RS) transmitted through multi-panels from a base station, and reporting, to the base station, CSI generated based on the CSI-RS measurement. If the user equipment is configured with CSI reporting excluding a matrix index for a phase calibration between panels from the base station, the CSI may include only a first matrix index for a wideband (WB) panel compensation and a second matrix index for a subband (SB) panel compensation, and may be calculated using the first matrix index, the second matrix index, and a specific matrix index related to the phase calibration between panels.

Furthermore, in the method according to an embodiment of the disclosure, the first matrix index and the second matrix index may be included in a precoding matrix indicator (PMI) within the CSI and reported. In this case, a result calculated using the first matrix index, the second matrix index, and the specific matrix index related to the phase calibration between panels may be included in a channel quality indicator (CQI) within the CSI and reported.

In this case, the specific matrix index may be indicated by the base station through higher layer signaling.

Alternatively, the specific matrix index may belong to a matrix index set configured by the base station through higher layer signaling.

Alternatively, the specific matrix index may correspond to a lowest matrix index among matrix indices pre-configured in relation to the phase calibration between panels.

Alternatively, the specific matrix index may correspond to all matrix indices pre-configured in relation to the phase calibration between panels.

Alternatively, the specific matrix index may correspond to a matrix index, randomly selected by the user equipment, among matrix indices related to the phase calibration between panels.

Furthermore, in the method according to an embodiment of the disclosure, the CSI-RS measurement may be performed on at least one CSI-RS resource, selected by the user equipment, among CSI-RS resources configured by the base station. In this case, the CSI may further include an index for the at least one CSI-RS resource.

In a user equipment reporting channel state information (CSI) in a wireless communication system according to an embodiment of the disclosure, a user equipment includes a radio frequency (RF) unit for transmitting and receiving wireless signals and a processor controlling the RF unit. The processor may be configured to measure a CSI-reference signal (RS) transmitted through multi-panels from a base station and report, to the base station, CSI generated based on the CSI-RS measurement. If the user equipment may be configured with CSI reporting excluding a matrix index for a phase calibration between panels from the base station, the CSI may include only a first matrix index for a wideband (WB) panel compensation and a second matrix index for a subband (SB) panel compensation, and may be calculated using the first matrix index, the second matrix index, and a specific matrix index related to the phase calibration between panels.

Furthermore, in the user equipment according to an embodiment of the disclosure, the first matrix index and the second matrix index may be included in a precoding matrix indicator (PMI) within the CSI and reported. In this case, a result calculated using the first matrix index, the second matrix index, and the specific matrix index related to the phase calibration between panels may be included in a channel quality indicator (CQI) within the CSI and reported.

Advantageous Effects

According to an embodiment of the disclosure, there is an effect in that the complexity and/or overhead of the CSI reporting (or feedback) of a UE can be reduced because the amount of feedback information to be reported by the UE can be reduced.

Furthermore, according to an embodiment of the disclosure, there is an effect in that the complexity and/or overhead of CSI reporting of a UE can be reduced because CSI-RS measurement or CSI calculation and report can be performed on only some of resources configured or indicated in the UE.

Effects of the disclosure are not limited to the above-described effects, and other technical effects not described above may be evidently understood by those skilled in the art to which the disclosure pertains from the following description.

DESCRIPTION OF DRAWINGS

The accompanying drawings, which are included herein as a part of a description in order to help understanding of the disclosure, provide embodiments of the disclosure, and describe the technical features of the disclosure with the description below.

FIG. 1 illustrates an example of an overall structure of a new radio (NR) system to which a method proposed by the disclosure may be implemented.

FIG. 2 illustrates a relationship between a uplink (UL) frame and a downlink (DL) frame in a wireless communication system to which a method proposed by the disclosure may be implemented.

FIG. 3 illustrates an example of a resource grid supported in a wireless communication system to which a method proposed by the disclosure may be implemented.

FIG. 4 illustrates examples of resource grids for each antenna port and numerology to which a method proposed in the disclosure may be applied.

FIG. 5 is a diagram illustrating one example of a self-contained slot structure to which the method proposed in the present specification may be applied.

FIG. 6 illustrates examples of a connection scheme of a TXRU and an antenna element to which a method proposed in the disclosure may be applied.

FIG. 7 illustrates various examples of a service area for TXRU to which a method proposed in the disclosure may be applied.

FIG. 8 illustrates an example of an MIMO system using a 2D plane array structure to which a method proposed in the disclosure may be applied.

FIG. 9 illustrates an example of a CSI framework considered in an NR system to which a method proposed in the disclosure may be applied FIG. 10 illustrates an example of a multi-antenna structure to which a method proposed in the disclosure may be applied.

FIG. 11 illustrates an example of a plurality of antenna panel arrays to which a method proposed in the disclosure may be applied.

FIG. 12 illustrates an example of an operation flowchart of a UE reporting channel state information (CSI) in a wireless communication system to which a method proposed in the disclosure may be applied.

FIG. 13 illustrates a block diagram of a wireless communication device according to an embodiment of the disclosure.

FIG. 14 illustrates a block diagram of a communication device according to an embodiment of the disclosure.

MODE FOR INVENTION

Some embodiments of the disclosure are described in detail with reference to the accompanying drawings. A detailed description to be disclosed along with the accompanying drawings is intended to describe some exemplary embodiments of the disclosure and is not intended to describe a sole embodiment of the disclosure. The following detailed description includes more details in order to provide full understanding of the disclosure. However, those skilled in the art will understand that the disclosure may be implemented without such more details.

In some cases, in order to avoid making the concept of the disclosure vague, known structures and devices are omitted or may be shown in a block diagram form based on the core functions of each structure and device.

In the disclosure, a base station has a meaning as a terminal node of a network that directly communicates with a terminal. In this document, a specific operation described as being performed by the base station may be performed by an upper node of the base station in some cases. That is, it is apparent that various operations performed for communication with the terminal in the network constituted by multiple network nodes including the base station may be performed by the base station or network nodes other than the base station. A 'base station (BS)' may be replaced with terms including a fixed station, a Node B, an evolved-NodeB (eNB), a base transceiver system (BTS), an access point (AP), a next generation NB, general NB, gNodeB (gNB), and the like. Further, a 'terminal' may be fixed or mobile and may be replaced with terms including a mobile station (UE), a mobile station (MS), a user terminal (UT), a mobile subscriber station (MSS), a subscriber station (SS) Advanced Mobile Station (WT), a Wireless Terminal (WT), a Machine-Type Communication (MTC) device, a Machine-to-Machine (M2M) device, and a Device-to-Device (D2D) device, and the like.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the disclosure, and the use of such specific terms may be changed in various forms without departing from the technical sprit of the disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the disclosure may be supported by the standard documents disclosed in at least one of IEEE 802, 3GPP, and 3GPP2, that is, radio access systems. That is, steps or portions that belong to the embodiments of the disclosure and that are not described in order to clearly expose the technical spirit of the disclosure may be supported by the documents. Furthermore, all terms disclosed in this document may be described by the standard documents.

In order to more clarify a description, 3GPP LTE/LTE-A/New RAT(NR) is chiefly described, but the technical characteristics of the disclosure are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface.

Overview of System

FIG. 1 is a diagram illustrating an example of an overall structure of a new radio (NR) system to which a method proposed by the disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or µ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| µ | $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

In the embodiments of the disclosure, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB. Regarding a frame structure in the NR system, a size of various fields in the time domain is expressed as a multiple of a time unit of $T_s=1/(\Delta f_{mac} \cdot N_f)$ In this case, $\Delta f_{max}=480 \cdot 10^3$, and $N_f=4096$ DL and UL transmission is configured as a radio frame having a section of $T_f=(\Delta f_{max}/100)\cdot=10$ ms. The radio frame is composed of ten subframes each having a section of $T_{sf}=(\Delta f_{max} N_f/1000) \cdot T=1$ ms. In this case, there may be a set of UL frames and a set of DL frames.

FIG. 2 illustrates a relationship between a UL frame and a DL frame in a wireless communication system to which a method proposed by the disclosure may be implemented.

As illustrated in FIG. 2, a UL frame number I from a User Equipment (UE) needs to be transmitted $T_A=N_{TA}T_s$ before the start of a corresponding DL frame in the UE.

Regarding the numerology µ, slots are numbered in ascending order of $n_s^\mu \in \{0, \ldots N_{subframe}^{slots,\mu}-1\}$ in a subframe, and in ascending order of $n_{s,f}^\mu \in \{0, \ldots N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology µ, and Table 3 shows the number of OFDM symbols per slot for an extended CP in the numerology µ.

TABLE 2

| | | | Slot configuration | | |
|---|---|---|---|---|---|
| | | 0 | | | 1 |
| µ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |

TABLE 2-continued

| | | Slot configuration | | | | |
|---|---|---|---|---|---|---|
| | | 0 | | | 1 | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | | Slot configuration | | | | |
|---|---|---|---|---|---|---|
| | | 0 | | | 1 | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted may be inferred from another channel over which a symbol on the same antenna port is transmitted. When large-scale properties of a channel received over which a symbol on one antenna port may be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

FIG. 3 illustrates an example of a resource grid supported in a wireless communication system to which a method proposed by the disclosure may be implemented.

Referring to FIG. 3, a resource grid is composed of $N_{RB}^{\mu}N_{sc}^{RB}$ subcarriers in a frequency domain, each subframe composed of 14·2μ OFDM symbols, but the disclosure is not limited thereto.

In the NR system, a transmitted signal is described by one or more resource grids, composed of $N_{RB}^{\mu}N_{sc}^{RB}$ subcarriers, and $2^{\mu}N_{symb}^{(\mu)}$ OFDM symbols. Herein, $N_{RB}^{\mu} \leq N_{RB}^{max,\mu}$. The above N indicates the maximum transmission bandwidth, and it may change not just between numerologies, but between UL and DL.

In this case, as illustrated in FIG. 4, one resource grid may be configured for the numerology μ and an antenna port p.

FIG. 4 shows an example of antenna ports and ringer-specific resource grids to which the method proposed herein may be applied.

Each element of the resource grid for the numerology μ and the antenna port p is indicated as a resource element, and may be uniquely identified by an index pair (k,l̄). Herein, k=0, . . . , $N_{RB}^{\mu}N_{sc}^{RB}-1$ is an index in the frequency domain, and l̄=0, . . . , $2^{\mu}N_{symb}^{(\mu)}-1$ indicates a location of a symbol in a subframe. To indicate a resource element in a slot, the index pair (k,l) is used. Herein, l=0, . . . , $N_{symb}^{\mu}-1$.

The resource element (k,l̄) for the numerology μ and the antenna port p corresponds to a complex value $a_{k,l̄}^{(p,\mu)}$. When there is no risk of confusion or when a specific antenna port or numerology is specified, the indexes p and μ may be dropped and thereby the complex value may become $a_{k,l̄}^{(p,\mu)}$ or $a_{k,l̄}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{RB}^{\mu}-1$ in the frequency region.

Beam Management

In NR, beam management is defined as follows.

Beam management: A set of L1/L2 procedures for obtaining and maintaining a set of TRP(s) and/or UE beams that may be used for DL and UL transmission/reception, including at least:

Beam determination: an operation of a TRP(s) or UE selecting transmission/reception beam thereof.

Beam measurement: an operation of a TRP(s) or UE selecting transmission/reception beam thereof.

Beam reporting: an operation for a UE to report information of a beamformed signal based on beam measurement.

Beam sweeping: an operation of covering a spatial region using a transmitted and/or received beam for a time interval in a predetermined scheme.

Further, Tx/Rx beam correspondence in a TRP and a UE is defined as follows:

A Tx/Rx beam correspondence in a TRP is maintained if at least one of the followings is satisfied:

A TRP may determine a TRP reception beam for uplink reception based on a UE's downlink measurement for one or more transmission beams of the TRP.

A TRP may determine a TRP Tx beam for downlink reception based on uplink measurement of the TRP for one or more Rx beams of the TRP.

A Tx/Rx beam correspondence in a UE is maintained if at least one of the followings is satisfied:

A UE may determine a UE Tx beam for uplink transmission based on downlink measurement of the UE for one or more Rx beams of the UE.

A UE may determine a UE reception beam for downlink reception based on an instruction of a TRP based on uplink measurement for one or more Tx beams.

A capability indication of UE beam correspondence related information is supported to a TRP.

The following DL L1/L2 beam management procedures are supported within one or more TRPs.

P-1: Used to enable UE measurement for different TRP Tx beams to support selection of TRP Tx beam/UE Rx beam(s).

For beamforming in a TRP, P-1 generally includes intra-TRP/inter-TRP Tx beam sweeps from a set of different beams. For beamforming in the UE, P-1 typically includes a UE Rx beam sweep from a set of different beams.

P-2: Used to allow UE measurements for different TRP Tx beams to change inter/intra-TRP Tx beam(s).

P-3: UE measurement for the same TRP Tx beam is used to change the UE Rx beam when the UE uses beamforming.

Aperiodic reporting triggered by the network is at least supported in P-1, P-2, and P-3 related operations.

The UE measurement based on RS for beam management (at least CSI-RS) is constituted by K (total number of beams) beams and the UE reports the measurement results of N selected Tx beams. Here, N is not particularly a fixed number. Procedures based on RS for mobility purposes are not excluded. Reporting information at least includes a measurement quantity for N beam(s) if N<K and information indicating N DL transmission beams. In particular, for UEs with K'>1 non-zero-power (NZP) CSI-RS resources, the UE may report N' CRIs (CSI-RS resource indicators).

The UE may be set as the following higher layer parameters for beam management.

N≥1 reporting setting and M≥1 resource setting

Links between reporting settings and resource settings are set in agreed CSI measurement settings.

CSI-RS-based P-1 and P-2 are supported with the resource and reporting settings.

P-3 may be supported with or without the reporting settings.

Reporting setting that includes at least:

Information indicating a selected beam

L1 measurement reporting

Time domain operation (e.g., aperiodic operation, periodic operation, semi-persistent operation)

Frequency granularity when multiple frequency granularities are supported

Resource setting that includes at least:

Time domain operation (e.g., aperiodic operation, periodic operation, semi-persistent operation)

RS type: at least NZP CSI-RS

At least one CSI-RS resource set. Each CSI-RS resource set includes K≥1 CSI-RS resources (some parameters of K CSI-RS resources may be the same. For example, a port number, a time domain operation, density, and periodicity).

Further, NR supports a next beam report considering L group with L>1.

Information indicating minimal groups

Measurement quantity (L1 RSRP and CSI reporting support (when the CSI-RS is for CSI acquisition)) for N1 beam If applicable, information indicating NI DL transmission beams The group-based beam reporting as described above may be configured on a UE-by-UE basis. Further, the group-based beam reporting may be turned off on the UE-by-UE basis (e.g., when L=1 or NI=1).

NR supports that UE may trigger a mechanism which the UE recovers from the beam failure.

A beam failure event occurs when a quality of a beam pair link of an associated control channel is sufficiently low (e.g., a comparison with a threshold, a timeout of an associated timer). The mechanism recovered from the beam failure is triggered when the beam failure occurs.

The network explicitly configures in the UE with resources for transmission of UL signals for recovery purpose. Configurations of the resources are supported where the base station is listening from all or some directions (e.g., random access region).

The UL transmission/resource reporting the beam failure may be located at the same time instance as the PRACH (the resource orthogonal to the PRACH resource) or at a difference time instance (configurable for the UE) from the PRACH. The transmission of the DL signal is supported so that the UE may monitor the beam to identify new potential beams.

NR supports the beam management regardless of a beam-related indication. When the beam related indication is provided, information regarding a UE side beamforming/receiving procedure used for CIS-RS based measurement may be indicated to the UE through the QCL. As QCL parameters to be supported by the NR, parameters for delay, Doppler, average gain, etc. used in the LTE system and a spatial parameter for beamforming at a receiver is scheduled to be added and the QCL parameter may include angle of arrival related parameters in terms of UE reception beamforming and/or angle of departure related parameters in terms of base station reception beamforming. The NR supports the use of the same or different beams in the control channel and the corresponding data channel transmission.

For NR-PDCCH transmissions supporting robustness to beam pair link blocking, the UE may be configured to simultaneously monitor NR-PDCCH on M beam-pair links. Here, M≥1 and a maximum value of M may depend on at least a UE capability.

The UE may be configured to monitor the NR-PDCCH on different beam-pair link(s) in different NR-PDCCH OFDM symbols. Parameters related to a UE Rx beam configuration for monitoring the NR-PDCCH on multiple beam-pair links are configured by higher layer signaling or MAC CE and/or considered in a search space design.

At least, the NR supports an indication of a spatial QCL assumption between DL RS antenna port(s) and DL RS antenna port(s) for demodulation of the DL control channel. A candidate signaling method for a beam indication for the NR-PDCCH (i.e., a configuration method for monitoring the NR-PDCCH) includes MAC CE signaling, RRC signaling, DCI signaling, specification transparent and/or implicit methods, and combinations of the signaling methods.

For reception of a unicast DL data channel, the NR supports the indication of the spatial QCL assumption between the DL RS antenna port and the DMRS antenna port of the DL data channel.

Information indicating the RS antenna port is indicated via DCI (downlink grant). Further, the information also indicates the RS antenna port QCLed with the DMRS antenna port. A different set of DMRS antenna ports for a DL data channel may be represented as a different set of RS antenna ports and a QCL.

Hereinafter, prior to describing the methods proposed in the disclosure in detail, contents directly or indirectly related to the methods proposed in the disclosure will be briefly described first.

In next-generation communication including 5G, New Rat (NR), etc., as more and more communication devices require a larger communication capacity, there is a need for enhanced mobile broadband communication as compared with the existing radio access technology.

Further, massive machine type communications (MTCs), which provide various services anytime and anywhere by connecting many devices and objects, are one of the major issues to be considered in the next generation communication.

In addition, a communication system design or structure considering a service/UE sensitive to reliability and latency is being discussed.

The introduction of next generation radio access technology (RAT) considering enhanced mobile broadband communication (eMBB), massive MTC (mMTC), ultra-reliable and low latency communication (URLLC) is currently discussed, and in the disclosure, the technology is called 'new RAT (NR)' for convenience.

Self-Contained Slot Structure

In order to minimize the latency of data transmission in a TDD system, the fifth generation new RAT considers a self-contained slot structure as shown in FIG. 5.

That is, FIG. 5 is a diagram illustrating one example of a self-contained slot structure to which the method proposed in the disclosure may be applied.

In FIG. 5, a dashed area 510 indicates a downlink control area and a black area 520 indicates an uplink control area.

An unmarked area 530 may be used for downlink data transmission or for uplink data transmission.

Such a structure may be characterized in that DL transmission and UL transmission are sequentially performed in one slot, and DL data may be transmitted in one slot, and ULACK/NACK may also be transmitted and received.

Such a slot may be defined as a 'self-contained slot'.

That is, through such a slot structure, it takes less time for the eNB to retransmit data to the UE when a data transmission error occurs, thereby minimizing the latency of final data transmission.

In such a self-contained slot structure, there is a need for a time gap between the eNB and the UE for the conversion process from the transmission mode to the reception mode or from the reception mode to the transmission mode.

To this end, some OFDM symbols at the time of switching from DL to UL in the slot structure are configured to a guard period (GP).

Analog Beamforming

In the millimeter wave (mmW), the wavelength is shortened, so that a plurality of antenna elements may be installed in the same area.

That is, a total of 64 (8×8) antenna elements may be installed in a 2-dimension array at a 0.5 lambda (wavelength) interval on a panel of 4×4 cm with a wavelength of 1 cm in a 30 GHz band.

Therefore, in the mmW, it is possible to increase a beamforming (BF) gain to increase coverage or increase throughput by using multiple antenna elements.

In this case, if a transceiver unit (TXRU) is provided so that transmission power and phase may be adjusted for each antenna element, independent beamforming is possible for each frequency resource.

However, when the TXRUs are installed on all of approximately 100 antenna elements, there is a problem that effectiveness is deteriorated in terms of costs.

Therefore, a method of mapping a plurality of antenna elements to one TXRU and adjusting a direction of a beam using an analog phase shifter is considered.

Such an analog beamforming method has a disadvantage in that frequency selective beamforming may not be performed by making only one beam direction in all bands.

A hybrid BF (HBF) with B TXRUs, which is an intermediate form of digital BF and analog BF, and fewer than Q antenna elements, may be considered.

In the HBF, although there is a difference depending on a connection method of B TXRUs and Q antenna elements, the number of directions of the beams that may be transmitted at the same time is limited to B or less.

FIG. 6 illustrates examples of a connection scheme of a TXRU and an antenna element to which a method proposed in the disclosure may be applied.

Here, a TXRU virtualization model shows a relationship between an output signal of the TXRUs and an output signal of the antenna elements.

FIG. 6(*a*) illustrates an example of a scheme in which the TXRU is connected to a sub-array.

Referring to FIG. 6(*a*), the antenna element is connected only to one TXRU. Unlike FIG. 6(*a*), FIG. 6(*b*) illustrates a scheme in which the TXRU is connected to all antenna elements.

That is, in the case of FIG. 6(*b*), the antenna element is connected to all TXRUs.

In FIG. 6, W represents a phase vector multiplied by an analog phase shifter.

In other words, a direction of analog beamforming is determined by W. Here, mapping of CSI-RS antenna ports and TXRUs may be 1-to-1 or 1-to-many.

Reference Signal (RS) Virtualization

In the mmW, it is possible to transmit a PDSCH only in one analog beam direction at a time by analog beamforming.

Therefore, the eNB transmits data only to a small number of some UEs in a specific direction.

Therefore, if necessary, the analog beam direction is differently configured for each antenna port so that data transmission may be simultaneously performed to a plurality of UEs in several analog beam directions.

FIG. 7 illustrates various examples of a service area for TXRU to which a method proposed in the disclosure may be applied.

In FIG. 7, 256 antenna elements are divided into 4 parts to form 4 sub-arrays, and the structure of connecting the TXRU to each sub-array will be described as an example.

When each sub-array is constituted by a total of 64 (8×8) antenna elements in the form of a 2-dimensional array, specific analog beamforming may cover an area corresponding to a 15-degree horizontal angle area and a 15-degree vertical angle area.

That is, the zone where the eNB should be served is divided into a plurality of areas, and services are provided one by one at a time.

In the following description, it is assumed that the CSI-RS antenna ports and the TXRUs are 1-to-1 mapped.

Therefore, it may be interpreted that the antenna port and the TXRU have the same meaning as the following description.

If all TXRUs (antenna ports, sub-arrays) have the same analog beamforming direction as illustrated in FIG. 7(*a*), the throughput of the corresponding zone may be increased by forming digital beam with higher resolution.

Further, it is possible to increase the throughput of the corresponding zone by increasing the RANK of the transmission data to the corresponding zone.

In addition, as illustrated in FIG. 7(*b*), if each TXRU (antenna port, sub-array) has a different analog beamforming direction, the data may be transmitted simultaneously to UEs distributed in a wider area in the subframe (SF).

As illustrated in FIG. 7(*b*), two of four antenna ports are used for PDSCH transmission to UE1 in region 1 and the remaining two antenna ports are used for PDSCH transmission to UE2 in Area 2.

Further, FIG. 7(*b*) illustrates an example in which PDSCH 1 transmitted to UE 1 and PDSCH 2 transmitted to UE 2 are subjected to spatial division multiplexing (SDM).

Unlike this, as illustrated in FIG. 7(c), PDSCH 1 transmitted to UE 1 and PDSCH 2 transmitted to UE 2 may be transmitted by frequency division multiplexing (FDM).

Among a scheme of servicing one area using all the antenna ports and a scheme of servicing many areas at the same time by dividing the antenna ports, a preferred scheme may be changed according to the RANK and the MCS servicing to the UE for maximizing the cell throughput.

Further, the preferred scheme is changed according to the amount of data to be transmitted to each UE.

The eNB calculates a cell throughput or scheduling metric which may be obtained when one area is serviced using all the antenna ports, and calculates the cell throughput or scheduling metric which may be obtained when two areas are serviced by dividing the antenna ports.

The eNB compares the cell throughput or the scheduling metric which may be obtained by each scheme to select the final transmission scheme.

As a result, the number of antenna ports participating in PDSCH transmission is changed by SF-by-SF.

In order for the eNB to calculate the transmission MCS of the PDSCH according to the number of antenna ports and reflect the calculated transmission MCS to a scheduling algorithm, the CSI feedback from the appropriate UE is required.

Further, in the case of 3-dimensional multiple-input multiple-output (3D-MIMO) or full-dimension multiple-input multiple-output (MIMO) technology, an active antenna system (AAS) having a 2-dimensional planar array structure may be used.

FIG. 8 illustrates an example of an MIMO system using a 2D plane array structure to which a method proposed in the disclosure may be applied.

Through the 2D plane array structure, a large number of antenna elements may be packed within available base station type of elements and an adaptive electronic capability in a 3D space may be provided.

Channel State Information Feedback

In most of cellular systems including a legacy LTE system, a UE receives a pilot signal (e.g., a reference signal (RS)) for channel estimation from a base station, calculates channel state information (CSI), and reports a calculated value to the base station. The base station transmits a data signal (i.e., downlink data) based on the CSI information fed back by the UE. In the case of an LTE system, CSI information fed back by a UE includes channel quality information (CQI), a precoding matrix index (PMI), or a rank indicator (RI). Hereinafter, CQI feedback, PMI feedback, and RI feedback are described in detail.

First, CQI feedback is wireless channel quality information provided from a UE to a base station for the purpose of providing information for which modulation and coding scheme (MCS) will be applied when the base station transmits data. If wireless quality between the base station and the UE is high, the UE feeds a high CQI value back to the base station. The base station that has received the high CQI value through feedback transmits data by applying a relatively high modulation order and low channel coding rate. In contrast, if wireless quality between the base station and the UE is low, the UE feeds a low CQI value back to the base station. The base station that has received the low CQI value through feedback transmits data by applying a relatively low modulation order and high channel coding rate.

Next, PMI feedback is preferred precoding matrix information provided from a UE to a base station for the purpose of providing information for which multiple-input multiple-output (MIMO) precoding scheme will be applied if the base station has installed multiple antennas. The UE estimates a downlink MIMO channel between the base station and the UE from a pilot signal, and transmits information indicating that it is efficient when the base station applies which MIMO precoding through PMI feedback. In the case of an LTE system, in a PMI configuration, only linear MIMO precoding which may be represented in a matrix form is considered.

In this case, the base station and the UE share a codebook configured with a plurality of precoding matrices. Each MIMO precoding matrix within the codebook has a unique index. Accordingly, the UE minimizes the amount of feedback information of the UE because it feeds an index, corresponding to the most preferred MIMO precoding matrix within the codebook, back through a PMI. In this case, the PMI value does not needs to be essentially set as one index only.

For example, in an LTE system, if the number of transmit antenna ports is 8, a configuration may be performed so that the final 8 transmission (Tx) MIMO precoding matrices can be derived only when two indices (e.g., W1 and W2) are combined. W1 corresponding to the first PMI is fed back in a longer period (e.g., long term) and may be referred to as a wideband PMI because it has wideband attributes. In general, W1. Furthermore, W1 corresponding to the second PMI is fed back in a shorter period (e.g., short term) and may be referred to as a subband PMI because it has subband attributes.

In this case, the final precoder may be configured with the product of W1 and W2. In this case, W1 may be configured to select a beam group for each polarization in a cross-polarization antenna environment, and W2 may be configured for the final beam selection and co-phasing between cross-polarization in each polarization. The number of beams belonging to a beam group may be one. In this case, W2 may be configured for only co-phasing. The number of beams belonging to a beam group, and what a beam group will be selected based on which pattern of a vertical beam and horizontal beam index combination may be designated by a base station through a codebook configuration parameter.

Next, RI feedback is information for the number of preferred transport layers provided from a UE to a base station for the purpose of providing, by the UE, information for the number of preferred transport layers if the base station and the UE install multiple antennas and is capable of multi-layer transmission through spatial multiplexing. In this case, an RI has a close relation with a PMI. The reason for this is that the base station needs to be aware that which precoding must be applied to each layer based on the number of transport layers.

In a PMI/RI feedback configuration, a method of configuring a PMI codebook based on single-layer transmission, defining a PMI for each layer, and feeding, by a UE, the PMI may be considered. However, such a method has a disadvantage in that the amount of information of PMI/RI feedback is greatly increased according to an increase in the number of transport layers. Accordingly, in the case of an LTE system, a PMI codebook according to each number of transport layers has been defined. That is, for R-layer transmission, N matrices of a size NtxR are defined in a codebook. In this case, R means the number of layers, Nt means the number of Tx antenna ports, and N means the size of the codebook. Accordingly, in the case of an LTE system, the size of a PMI codebook is defined regardless of the number of transport layers. In this case, the number of transport layers (R) is identical with a rank value of a precoding matrix (Nt×R matrix).

Furthermore, in full dimension (FD)-MIMO of an LTE system, a non-precoded CSI-RS-based Class A operation and a beamformed CSI-RS-based Class B operation have been defined. In this case, the Class A operation has the greatest characteristic in that a PMI codebook designed to support horizontal beamforming has been extended to support vertical and horizontal beamforming. Unlike the existing operation and the Class A operation, the Class B operation is characterized in that a base station performs transmission by applying beamforming upon CSI-RS transmission (e.g., transmission using a method similar to a DMRS).

For example, a 4-port CSI-RS resource A and a 4-port CSI-RS resource B may be configured so that beamforming in different orientations are applied to the resources A and B in a resource unit and the resources A and B are transmitted. In this case, a UE may select a resource having excellent quality, among the two CSI-RS resources, and may feed channel state information (e.g., PMI, CQI, RI) for a corresponding resource back. An index related to such CSI-RS resource selection may be referred to as a CSI-RS resource indicator (CRI), and may be fed back along with different channel state information (e.g., PMI, CQI, RI) as a CSI feedback parameter.

In the case of the Class B operation, different beamforming may be applied for each port within the same resource. In this case, only a specific port may be optionally used as a port selection codebook or a port selection codebook may be combined as a port combining codebook and used.

Furthermore, in enhanced FD-MIMO (eFD-MIMO), a technology called a hybrid CSI operation is considered. This is a concept in which the existing 2-step procedure in which a base station transmits a CSI-RS and a UE performs CSI calculation and feedback has been extended to a 4-step procedure in which i) a base station transmits a CSI-RS, ii) a UE performs CSI calculation and feedback, iii) the base station transmits the CSI-RS based on the CSI feedback, and iv) the UE performs CSI calculation and feedback. In this case, the following two mechanisms may be considered.

First, a "hybrid CSI mechanism 1" of a form in which the Class A operation and the Class B operation have been combined may be considered. The corresponding mechanism may be configured so that i) a base station transmits a non-precoded CSI-RS, ii) a UE feeds back an RI and a (WB) PMI, iii) the base station transmits a beamformed CSI-RS based on the feedback information, and iv) the UE feeds back a PMI, RI, or CQI for the beamformed CSI-RS.

Next, a "hybrid CSI mechanism 2" in which two Class B operations have been combined may be considered. The corresponding mechanism may be configured so that i) a base station transmits a plurality of beamformed CSI-RS resources, ii) a UE feeds back a CRI (accordingly, a beam is selected), iii) the base station transmits beamformed CSI-RS ports based on the CRI, and iv) the UE feeds back a PMI, RI, or CQI for the CSI-RS.

A PMI/RI described in the disclosure is not limited to mean a PMI/RI in an LTE system, meaning an index value of a precoding matrix (Nt×R matrix) and a rank value of the precoding matrix. Furthermore, a PMI described in the disclosure means information indicating preferred MIMO precoder information among MIMO precoders applicable in a transmission stage. In this case, a form of the precoder is not limited to only a linear precoder that may be represented as a matrix. Furthermore, an RI described in the disclosure includes all pieces of feedback information indicating the number of preferred transport layers, and may be interpreted as a wider meaning than an RI in LTE.

Such CSI information may be generated for a full system frequency domain or may be generated for some frequency domain. In particular, in a wideband (or broadband) system, a method of generating and feeding back CSI information for some preferred frequency domains (e.g., subbands) for each UE may be efficient.

Furthermore, in an LTE system, feedback for CSI information is performed through an uplink channel. In general, periodic CSI feedback is performed through a physical uplink control channel (PUCCH), and aperiodic CSI feedback is performed through a physical uplink control shared (PUSCH).

A PUCCH CSI reporting mode for periodic CSI feedback performed through a PUCCH may be defined like Table 4. In this case, the PUCCH CSI reporting mode means that it has been classified as a mode regarding that a UE has to feedback which information if the UE performs periodic CSI feedback.

TABLE 4

| | | PMI Feedback Type | |
| --- | --- | --- | --- |
| | | No PMI(OL, TD, single-antenna) | Single PMI (CL) |
| CQI Feedback Type | Wideband | Mode 1-0<br>RI(only for Open-loop SM)<br>One wideband CQI(4 bit)<br>When RI > 1, CQI of first codeword | Mode 1-1<br>RI<br>Wideband CQI(4 bit)<br>Wideband spatial CQI(3 bit) for RI > 1<br>Wideband PMI(4 bit) |
| | UE selected | Mode 2-0<br>RI(only for Open-loop SM)<br>Wideband CQI(4 bit)<br>Best-1 CQI(4 bit) in each BP<br>Best-1 indicator(L-bit label)<br>when RI > 1, CQI of first codeword | Mode 2-1<br>RI<br>Wideband CQI(4 bit)<br>Wideband spatial CQI(3 bit) for RI > 1<br>Wideband PMI(4 bit)<br>Best-1 CQI(4 bit) in each BP<br>Best-1 spatial CQI(3 bit) for RI > 1<br>Best-1 indicator(L-bit label) |

Unlike periodic CSI feedback, aperiodic CSI feedback is temporarily performed only when a base station requests CSI feedback information. In this case, the base station triggers aperiodic CSI feedback through a downlink control channel, such as a physical downlink control channel (PDCCH)/enhanced PDCCH (ePDCCH). In an LTE system, if aperiodic CSI feedback is triggered, a PUSCH CSI reporting mode regarding that a UE has to feedback which information may be defined like Table 5. In this case, the PUSCH CSI reporting mode in which the UE will operate may be indicated through higher layer signaling (i.e., a higher layer message).

a channel state between a Tx antenna and an Rx antenna needs to be detected in order to precisely receive a signal. Accordingly, each Tx antenna has to have an individual reference signal.

TABLE 5

|  |  | PMI Feedback Type | |
|---|---|---|---|
|  |  | No PMI(OL, TD, single-antenna) | With PMI (CL) |
| PUSH CQI Feedback type | Wideband (wideband CQI) |  | Mode 1-2: Multiple PMI RI $1^{st}$ wideband CQI(4 bit) $2^{nd}$ wideband CQI(4 bit) if RI > 1 Subband PMIs on each subband |
|  | UEselected (subband CQI) | Mode 2-0 RI(only for Open-loop SM) Wideband CQI(4 bit) + Best-M CQI(2 bit) Best-M index when RI > 1, CQI of first codeword | Mode 2-2: Multiple PMI RI $1^{st}$ wideband CQI(4 bit) + Best-M CQI(2 bit) $2^{nd}$ wideband CQI(4 bit) + Best-M CQI(2 bit) if RI > 1 Wideband PMI Best-M PMI Best-M index |
|  | Higher layer-configured (subband CQI) | Mode 3-0 RI(only for Open-loop SM) Wideband CQI(4 bit) + subband CQI(2 bit) When RI > 1, CQI of first codeword | Mode 3-1: Single PMI RI $1^{st}$ wideband CQI(4 bit) + subband CQI(2 bit) $2^{nd}$ wideband CQI(4 bit) + subband CQI(2 bit) Wideband PMI |

A PUCCH has a small amount of data (i.e., payload size) which may be transmitted at once compared to a PUSCH. In the case of the PUCCH, it may be difficult to transmit CSI information to be transmitted at once. Accordingly, timing (e.g., subframe) in which a CQI and PMI are transmitted and timing in which an RI is transmitted may be differently configured depending on each PUCCH CSI reporting mode. For example, in the case of Mode 1-0 of Table 4, a UE may transmit only an RI at specific PUCCH transmission timing, and may transmit a wideband CQI at different PUCCH transmission timing.

Furthermore, the PUCCH reporting type may be defined depending on the type of CSI information configured at specific PUCCH transmission timing. For example, a reporting type in which only an RI is transmitted corresponds to Type 3, and a reporting type in which only a wideband CQI is transmitted corresponds to Type 4. A feedback period and offset value for an RI and a feedback period and offset value for a CQI/PMI may be indicated (or configured) in a UE through higher layer signaling (i.e., a higher layer message).

The aforementioned CSI feedback information is included in uplink control information (UCI).

Reference Signal (RS)

In a wireless communication system, data is transmitted through a wireless channel, and thus a signal may be distorted during transmission. In order for a reception stage to correctly receive a distorted signal, the distortion of the received signal needs to be corrected using channel information. In order to detect channel information, a method of detecting channel information using a signal transmission method known to both the transmission side and the reception side and the degree that a signal has been distorted when it is transmitted through a channel is chiefly used. The aforementioned signal is called a pilot signal or a reference signal (RS).

Furthermore, recently, in most of mobile communication systems, a method capable of improving transmission and reception data efficiency by adopting multiple Tx antennas and multiple Rx antennas without using one Tx antenna and one Rx antenna when a packet is transmitted is used. When data is transmitted and received using multiple I/O antennas, In the case of an LTE system, the use of a pilot signal or RS may be defined as 4 types as follows.

(1) Measurement RS: pilot for channel state measurement

1) CSI measurement/reporting use (short term measurement): purposes for link adaptation, rank adaptation, closed loop MIMO precoding, etc.

2) Long term measurement/reporting use: purposes for handover, cell selection/reselection, etc.

(2) Demodulation RS: pilot for physical channel (3) Positioning RS: pilot for UE location estimation (4) Multicast-broadcast single-frequency network reference signal (MBSFN RS): pilot for multicast/broadcast service In a mobile communication system, an RS may be basically divided into two types depending on its purpose. The RS includes an RS having a purpose for channel information acquisition and an RS used for data demodulation. The former needs to be transmitted in a wideband because it has an object of acquiring, by a UE, channel information in downlink. Although a UE does not receive downlink data in a specific subframe, the UE needs to be able to receive and measure a corresponding RS. Furthermore, the RS is used for the measurement, etc. of handover, etc. The latter is an RS transmitted in a corresponding resource when a base station transmits downlink. A UE may perform channel estimation by receiving a corresponding RS and may demodulate data. The RS needs to be transmitted in a region in which data is transmitted.

In this case, in order to solve an RS overhead problem attributable to an increase in the number of antennas, a channel state information-RS (CSI-RS) may be used as an RS having a purpose for channel information acquisition, and a UE-specific RS may be used as an RS for data demodulation. A CSI-RS is an RS designed for only CSI measurement and feedback, and has very low RS overhead compared to a cell-specific reference signal (CRS). Furthermore, the CRS supports up to 4 multiple antennas ports, whereas the CSI-RS has been designed to support up to 8 multiple antennas ports.

Furthermore, a UE-specific RS is an RS (i.e., precoded RS) which has been designed for only the demodulation of a data channel and whose MIMO precoding scheme upon data transmission for a corresponding UE has been identically applied to a pilot signal, unlike a CRS. Accordingly, a UE-specific RS has only to be transmitted by the number of transport layers (i.e., transmission rank) and does not need to be transmitted by the number of antenna ports like a CRS and a CSI-RS. Furthermore, a UE-specific RS is characterized as a UE-specific RS because it is transmitted for the data channel reception of a corresponding UE in the same resource region as a data channel resource region allocated to each UE through the scheduler of a base station.

Furthermore, in the case of LTE uplink, a sounding RS (SRS) is present as a measurement RS, and there are a demodulation RS (i.e., DM-RS) for an uplink data channel (PUSCH) and a demodulation RS for an uplink control channel (PUCCH) for ACK/NACK and CSI feedback.

Furthermore, in the case of an NR system, a phase-tracking reference signal (PTRS) for measuring and tracking a change in the phase may be present.

CSI Framework in NR System

In relation with an MIMO design of the NR system, a CSI framework for measuring and reporting a channel state between the eNB and the UE is considered. A CSI framework considered in the NR system is described in detail below.

The CSI framework may mean that a CSI related procedure is defined using CSI reporting setting, resource setting, CSI measurement setting, and CSI measurement setting unlike a legacy LTE system in which the CSI related procedure is defined only in the form of a CSI process. Accordingly, in the NR system, the CSI related procedures may be performed in a more flexible scheme according to a channel and/or resource situation.

That is, a configuration for the CSI related procedure in the NR system may be defined by combining the CSI reporting setting, the resource setting, and the CSI measurement setting.

For example, the UE may be configured to acquire the CSI by $N \geq 1$ CSI reporting settings, $M \geq 1$ resource settings, and one CSI measurement setting. Here, the CSI measurement setting may mean setting information for a link between N CSI reporting settings and M resource settings. Further, here, the resource settings include reference signal (RS) settings and/or Interference Measurement settings (IM settings).

FIG. 9 illustrates an example of a CSI framework considered in an NR system to which a method proposed in this specification may be applied.

Referring to FIG. 9 may be configured by reporting setting 902, measurement setting 904, and resource setting 906. Here, the reporting setting may mean the CSI reporting setting, the measurement setting may mean the CSI measurement setting, and the resource setting may mean the CSI-RS resource setting.

In FIG. 9, a CSI-RS resource has been illustrated, but the disclosure is not limited thereto. The CSI-RS resource may be substituted with a resource for a downlink reference signal (DL RS) which may be used for CSI acquisition or beam management.

As illustrated in FIG. 9, the reporting setting 902 may be constituted by N ($N \geq 1$) report settings (e.g., Reporting setting n1, Reporting setting n2, etc.).

Further, the resource setting 906 may be constituted by M ($M \geq 1$) resource settings (e.g., Resource setting m1, Resource setting m2, Resource setting m3, etc.). Here, each resource setting may include S ($S \geq 1$) resource sets and each resource set may include K ($K \geq 1$) CSI-RSs.

Further, the measurement setting 904 may mean setting information indicating the link between the reporting setting and the resource setting and a measurement type configured for the corresponding link. In this case, each measurement setting may include L ($L \geq 1$) links. For example, the measurement setting may include setting information for a link (Link l1) between Reporting setting n1 and Resource setting m1, setting information for a link (Link l2) between Reporting setting n1 and Resource setting m2, and the like.

In this case, each of Link l1 and Link l2 may be configured as any one of a channel measurement link or an interference measurement link. Moreover, Link l1 and/or Link l2 may be configured for rate matching or other purposes.

In this case, one or more CSI reporting settings within one CSI measurement setting may be selected dynamically via Layer 1 (L2) signaling or L2 (Layer 2) signaling. Further, one or more CSI-RS resource sets selected from at least one resource setting and one or more CSI-RS resources selected from at least one CSI-RS resource set are also dynamically selected via the L1 or L2 signaling.

Hereinafter, the CSI reporting setting, the resource setting (i.e., CSI-RS resource setting), and the CSI measurement setting constituting the CSI framework considered in the NR system will be described.

CSI Reporting Setting

First, the CSI reporting setting may mean information for setting a type of CSI reporting which the UE is to perform with respect to the eNB, information included in the CSI reporting, and the like.

For example, the CSI reporting setting may include a time-domain behavior type of a time domain, frequency granularity, CSI parameters (e.g., Precoding Matrix Indicator (PMI), Rank Indicator (RI), and Channel Quality Indicator (CQI)) to be reported, a CSI type (e.g., CSI Type 1 or 2, CSI with high complexity, or CIS with low complexity), a codebook configuration including codebook subset restriction, a measurement restriction configuration, and the like.

In the disclosure, the operation type of the time domain may mean an aperiodic operation, a periodic operation, or a semi-persistent operation.

In this case, a setting parameter(s) for the CSI reporting setting may be configured (or indicated) through higher layer signaling (e.g., RRC signaling).

Furthermore, in relation to the aforementioned CSI reporting setting, wideband reporting, partial band reporting and subband reporting may be supported as three frequency granularities.

Resource Setting

Next, the resource setting may mean information for setting resource to be used for CSI measurement and reporting. For example, the resource setting may include an operation pattern of the time domain, a type (e.g., Non-Zero Power CSI-RS (NZP CSI-RS), Zero Power CSI-RS (ZP CSI-RS), DMRS, etc.) of the RS, a resource set constituted by K resources, and the like.

As mentioned above, each resource setting may include one or more resource sets and each resource set may include one or more resources (e.g., CSI-RS resources). Further, the resource setting may include a setting for a signal for channel measurement and/or interference measurement.

As an example, each resource setting may include setting information for S resource sets (e.g., CSI-RS resource sets) and may also include setting information for K resources for each resource set. In this case, each resource set may correspond to sets differently selected from a pool of all CSI-RS resources configured for the UE. Further, the setting information for each resource may include information to a resource element, the number of ports, the operation type of the time domain, and the like.

Alternatively, as another example, each resource setting may include setting information for S CSI-RS resources and/or K CSI-RS resources of ports of a number equal to or smaller than each CSI-RS resource.

In this case, the CSI-RS RE mapping pattern of an N-port CSI-RS resource may be configured as one or more CSI-RS mapping patterns of CSI-RS resources having the same or smaller number of ports (e.g., 2, 4, or 8). In this case, the CSI-RS RS mapping pattern may be defined within a slot, and may be spanned over a plurality of configurable contiguous/discontiguous OFDM symbols.

In this case, a configuration parameter(s) for resource setting may be configured through higher layer signaling (e.g., RRC signaling).

Furthermore, in the case of each semi-persistent resource setting or periodic resource setting, periodicity may be additionally included in configuration information.

CSI Measurement Setting

Next, the CSI measurement setting may mean setting information indicating which measurement the UE is to perform with respect to a specific CSI reporting setting and a specific resource setting mapped thereto for the CSI reporting. That is, the CSI measurement setting may include information on the link between the CSI reporting setting and the resource setting and may include information indicating a measurement type for each link. Further, the measurement type may mean channel measurement, interference measurement, rate matching, etc.

As an example, the CSI measurement setting may include information indicating the CSI reporting setting, information indicating the resource setting, and a setting for a reference transmission scheme in the case of the CQI. In this regard, the UE may support L≥1 CSI measurement settings and an L value may be set according to a capability of the corresponding UE.

In this case, one CSI reporting setting may be connected to one or more resource settings and multiple CSI reporting settings may be connected to the same resource setting.

In this case, a setting parameter(s) for the CSI measurement setting may be configured through higher layer signaling (e.g., RRC signaling).

Furthermore, in an NR system, interference measurement based on a zero-power (ZP) CSI-RS for CSI feedback is supported. Furthermore, an aperiodic interference measurement resource (IMR), a semi-persistent IMR, and a periodic IMR based on a ZP CSI-RS for interference measurement for CSI feedback may be supported.

Further, in relation with the CSI reporting setting, the resource setting, and the CSI measurement setting, agreements depending on the operation type of the time domain are as follows.

First, in the case of the periodic CSI-RS (i.e., a case where transmission of the CSI-RS is periodically performed), semi-persistent CSI reporting may be activated/deactivated by MAC CE and/or downlink control information (DCI). Unlike this, the aperiodic CSI reporting may be triggered by the DCI, however, in this case, additional signaling configured to the MAC CE may be required.

Next, in the case of the semi-persistent CSI-RS (i.e., a case where transmission of the CSI-RS is semi-persistently performed), periodic CSI reporting is not supported. On the contrary, semi-persistent CSI reporting may be activated/deactivated by the MAC-CE and/or DCI and the semi-persistent CSI-RS may be activated/deactivated by the MAC-CE and/or DCI. Further, in this case, the aperiodic CSI reporting may be triggered by the DCI and the semi-persistent CS-RS may be activated/deactivated by the MAC-CE and/or DCI.

Last, in the case of the aperiodic CSI-RS (i.e., a case where transmission of the CSI-RS is aperiodically performed), the periodic (and semi-persistent) CSI reporting is not supported. On the contrary, the aperiodic CSI reporting may be triggered by the DCI and the aperiodic CS-RS may be triggered by the DC and/or MAC-CE.

Referring to the aforementioned contents and agreements, in an NR system, three operation types in the time domain may be supported in relation to CSI reporting. In this case, the three operation types in the time domain may mean aperiodic CSI reporting, semi-persistent CSI reporting, and periodic CSI reporting. Similarly, an NR system may support some of or all the three operation types in the time domain with respect to reporting related to an (analog and/or digital) beam.

As described above, the aperiodic CSI reporting may mean that a UE performs CSI reporting only upon triggering. Furthermore, the semi-persistent CSI reporting may mean that a UE performs CSI reporting (according to a specific period) when corresponding reporting is activated, and stops the CSI reporting when the corresponding reporting is deactivated. Furthermore, the periodic CSI reporting may mean that a UE performs CSI reporting based on a period and timing (e.g., slot offset) configured through higher layer signaling (e.g., RRC signaling), etc.

Furthermore, in the case of a downlink reference signal (DL RS) for channel measurement upon CSI acquisition, the three operation types (e.g., aperiodic CSI-RS, semi-persistent CSI-RS, and periodic CSI-RS) in the time domain may be supported. Similarly, some of or all the three operation types in the time domain may be supported for a DL RS for beam management. A CSI-RS is basically considered as a DL RS for beam management, but another DL signal may be used as the DL RS. For example, a DL RS for beam management may include a mobility RS, a beam RS, a synchronization signal (SS), an SS block, a DL DMRS (e.g., PBCH DMRS, PDCCH DMRS), etc.

As described above, the aperiodic CSI-RS may mean that a UE performs measurement on a CSI-RS only upon triggering. Furthermore, the semi-persistent CSI-RS may mean that a UE performs measurement on a CSI-RS (according to a specific period) when a corresponding CSI-RS is activated and stops the measurement for the CSI-RS when the corresponding CSI-RS is deactivated. Furthermore, the periodic CSI-RS may mean that a UE performs measurement on a CSI-RS based on a period and timing (e.g., slot offset) configured through higher layer signaling (e.g., RRC signaling), etc.

Furthermore, as described above, an NR system may support an interference measurement method based on a ZP CSI-RS in relation to an interference measurement resource (IMR) designed in a UE by a base station upon CSI acquisition. Furthermore, in relation to the interference measurement resource (IMR), at least one of an interference measurement method based on a non-zero-power (NZP) CSI-RS or an interference measurement method based on a DMRS may be supported.

In particular, in an LTE system (i.e., legacy LTE system), an IMR based on a ZP CSI-RS is semi-statically configured. In contrast, in an NR system, a method of dynamically configuring an IMR based on a ZP CSI-RS may be supported. For example, an aperiodic IMR, semi-persistent IMR and/or periodic IMR method based on a ZP CSI-RS may be used.

Accordingly, a combination of various operation types in the time region may be considered for channel estimation (or channel measurement), interference estimation (or interference measurement), and reporting for CSI measurement and reporting. For example, aperiodic CSI reporting may be configured along with an aperiodic/semi-persistent/periodic NZP CSI-RS for channel measurement and an aperiodic/semi-persistent/periodic ZP CSI-RS for interference measurement. For another example, semi-persistent CSI reporting may be configured along with a semi-persistent/periodic NZP CSI-RS for channel measurement and a semi-persistent/periodic ZP CSI-RS for interference measurement. For another example, periodic CSI reporting may be configured along with a periodic NZP CSI-RS for channel measurement and a periodic ZP CSI-RS for interference measurement.

In the disclosure, "A/B" means A or B, and a combination including a changed sequence may also be considered between "/." For example, "A/B and C/D" may mean "A and C", "A and D", "B and C", or "B and D."

In the examples, it has been assumed that the aperiodic RS and/or IMR (e.g., aperiodic NZP CSI-RS and/or aperiodic ZP CSI-RS) is used for only aperiodic reporting, the semi-persistent RS and/or IMR (e.g., semi-persistent NZP CSI-RS and/or semi-persistent ZP CSI-RS) are used for only aperiodic or semi-persistent reporting, and the periodic RS and/or IMR (e.g., periodic NZP CSI-RS and/or periodic ZP CSI-RS) are used for all reports. However, the disclosure is not limited thereto and may be configured as various combinations (e.g., semi-persistent reporting configured along with aperiodic RS and/or IMR).

Furthermore, both the RS and the IMR are included in resource setting, and whether they are used for a corresponding resource (e.g., for channel estimation or for interference estimation) may be indicated through the configuration of each link in a measurement setting.

Furthermore, if the aforementioned aperiodic CSI reporting is performed in an uplink data channel (e.g., physical uplink control shared (PUSCH)), the following methods may be considered.

First, corresponding CSI reporting may be configured to be multiplexed with uplink data transmitted through an uplink data channel. In other words, the CSI reporting and the uplink data may be transmitted together through the uplink data channel.

Alternatively, a configuration may be performed so that only corresponding CSI reporting is transmitted through an uplink data channel without uplink data.

Such methods may be in common applied to an uplink control channel (e.g., physical uplink control channel (PUCCH)) in addition to an uplink data channel.

Multi-Antenna Structure in NR System

Today a cellular system evolves into the fifth generation (5G) (e.g., NR system) via the fourth generation (4G) (e.g., LTE system).

In the utilization of the 5G communication, various Internet of things (loT) application services, such as healthcare, disaster safety, vehicle communication, factory control, and robot control, in addition to evolution (e.g., eMBB, enhanced mobile broadband) into the existing smartphone-based mobile broadband services are considered. Accordingly, the form of a UE is variously changed. Furthermore, in the 5G communication, the utilization of an ultrahigh frequency band including a millimeter wave band up to a maximum of 100 GHz is considered.

As such various implementation forms of a UE and ultrahigh frequency band are used, several tens or several hundreds of antennas may be considered as an antenna which can be mounted on a UE of the 5G system unlike the 4G system. For example, as in FIG. 10, a vehicle may be one UE, and a plurality of antennas may be distributed and installed on one or several vehicle locations.

FIG. 10 illustrates an example of a multi-antenna structure to which a method proposed in the disclosure may be applied.

Alternatively, for another example, as in FIG. 11, a plurality of antenna panel arrays may be installed on a UE in a high frequency band. In this case, a plurality of antenna elements may be distributed at uniform intervals within the antenna panel arrays, but an antenna orientation or interval may be irregularly configured between the antenna panel arrays.

FIG. 11 illustrates an example of a plurality of antenna panel arrays to which a method proposed in the disclosure may be applied.

If a plurality of antenna arrays and/or panels is mounted on a UE with different directivities (or coverage) as in the aforementioned examples, the application of a codebook designed by assuming a precoding method standardized like a uniform linear/rectangular array as in the existing uplink (UL) MIMO method may be difficult.

Furthermore, if the distance between a plurality of mounted antenna arrays and/or panels and a baseband processor is different, a fixed phase difference attributable to a delay difference may occur. This may cause a phenomenon in which the time synchronization of a signal transmitted in a different antenna unit is different. In a base station reception stand, a phenomenon in which the phase of a signal transmitted in a specific UE antenna group is lineally distorted in proportion to subcarriers may occur (OFDM system, a delay difference within a CP is assumed).

Furthermore, if a signal transmitted in each antenna array and/or panel uses a different oscillator, the signal may be transmitted in a finely different frequency due to an error between the oscillators. This may cause a frequency sync error in a base station. In this case, in the base station stand, phenomena, such as the size reduction of signals transmitted in a specific UE antenna group, the phase distortion of the signals, and a noise increase attributable to ICI, may occur.

Codebook in NR System

In an NR system, a codebook for Type 1 CSI and a codebook for Type 2 CSI have been defined.

In the case of Type 1 CSI, a precoding matrix indicator (PMI) codebook may be configured through at least two steps. In this case, a PMI codebook W may be represented as the product of W1 and W2. In this case, the W1 codebook may mean a codebook for beam group selection. Furthermore, the W1 codebook means a codebook having a wideband characteristic. The W2 codebook may function to additionally select the best beam among beam groups selected by W1, and to select and compensate for the best phase difference value between antenna ports transmitted in two different polarization antennas that belong to a corresponding beam. The W2 codebook may mean a codebook having a subband or wideband characteristic depending on CSI reporting setting.

In the case of Type 2 CSI, corresponding CSI may be divided into the first category of Type 2 CSI, the second category of Type 2 CSI, and the third category of Type 2 CSI. In this case, the first category of Type 2 CSI may mean precoder feedback, the second category of Type 2 CSI may mean covariance matrix feedback, and the third category of Type 2 CSI may mean hybrid CSI feedback (e.g., CSI feedback based on port selection/combining codebook). In this case, even in the case of Type 2 CSI, a PMI codebook W may be represented as the product of W1 and W2.

First, in the case of the first category of Type 2 CSI, W1 may be configured as a set of L orthogonal beams derived from 2 dimension (2D) DFT beams. In this case, the L beam set may be configured based on an oversampled 2D DFT beam. Furthermore, beam selection may be performed with a wideband characteristic. In contrast, in the case of W2, L beams may be combined in common with W1 in W2. In this case, W2 may mean subband reporting or wideband reporting for the phase quantization of a beam combining coefficient.

Next, in the case of the second category of Type 2 CSI, the feedback of a channel covariance matrix may have a long term and a wideband characteristic. In this case, a UE may report a quantized/compressed version of a covariance matrix. Quantization/compression may be based on a set of M orthogonal basis vectors. Furthermore, corresponding reporting may include the indicator of M base vectors along with a set of coefficients.

Next, in the case of the third category of Type 2 CSI, a CSI codebook corresponding to the first category of Type 2 CSI or the second category of Type 2 CSI may be used along with LTE-Class-B-type-line CSI feedback.

The aforementioned problem of size/phase distortion between UE Tx antenna groups may be different depending on a UE implementation form. For example, the aforementioned cabling issue may be solved in an implementation way in such a manner that a UE performs a separate procedure of compensating for a delay difference for each antenna group. The oscillator issue may be solved in an implementation way using a single oscillator or introducing a separate frequency compensation procedure.

However, such a compensation process may increase a UE implementation complexity and cost because it may require separate hardware (e.g., processor and RF circuit), etc. As described above, a form of a 5G UE (i.e., a UE of an NR system) includes all of a UE for obtaining high quality by applying a high cost processor and a low cost IoT UE. Accordingly, it is preferred to diversity and support a level of the distortion phenomenon.

Accordingly, an adaptive uplink multi-antenna transmission scheme according to the size/phase distortion degree (inter-APG distortion vulnerability level) of a signal between different antenna port groups (APGs) for each UE and a related signaling procedure may be considered like the following methods (methods 1 to 6). Hereinafter, for convenience of description, in the disclosure, a distortion vulnerability level, that is, information vulnerable to distortion, may be referred to as a DVL.

Method 1

A UE may report information to a base station as follows.

First, in the case of a non-precoded SRS, a UE may report port group information for the port(s) of an uplink reference signal (RS) to a base station. In this case, in SRS port group information, all M SRSs are configured with several port groups, and the SRS port group information may be information that explicitly or implicitly indicates how many SRS ports are included in each port group.

Alternatively, in the case of a beamformed SRS, a UE may report, to a base station, the number of uplink antenna arrays/panels/groups, port group information of a reference signal and/or information for a maximum number of reference signal ports per port group of a reference signal. In this case, the base station that has received the information may indicate port group information in a process of performing an uplink reference signal transmission configuration for the corresponding UE.

Furthermore, the UE may additionally report, to the base station, DVL information between port groups.

In this case, the base station that has received the aforementioned reference signal port group information may use the corresponding information for one or more of uplink MIMO precoding configuration information, uplink synchronization estimation/correction, uplink channel estimation, or a distortion compensation for each reference signal (RS) port group. If the corresponding information is used for a distortion compensation for each reference signal port group, the base station may signal, to the UE, a size/phase compensation value for each reference signal port group.

Method 2

A base station may configure configuration information of an uplink MIMO precoder to be indicated in a UE, as follows.

The configuration information of the uplink MIMO precoder may include partial precoder configuration information. Specifically, the configuration information of the uplink MIMO precoder may be configured as PMI information (in particular, in the case of a non-precoded SRS) to be used for each SRS port group or SRS port index information (in particular, in the case of a beamformed SRS).

Furthermore, the configuration information of the uplink MIMO precoder may include size/phase concatenating information (e.g., concatenating precoder) between partial precoders. In this case, the presence or absence and the size of the information may be different based on a DVL of a UE or the indication of a base station. Furthermore, whether a concatenating precoder is cycled and the range (e.g., precoder set information) of the concatenating precoder may be further included in the corresponding information. Furthermore, transmission diversity or open-loop precoding may be included in a candidate concatenating precoding method.

Furthermore, the configuration information of the uplink MIMO precoder may include information for the number (i.e., rank) of simultaneous transmission data. This may be indicated as a common value for all SRS ports.

Method 3

Furthermore, in relation to semi-open loop uplink MIMO precoding, a UE having a DVL of a specific level or a UE indicated to use the following scheme by a base station may configure a MIMO precoder to be applied upon uplink transmission as follows.

A partial precoder may be determined through information (i.e., downlink control information) indicated by a base station.

Furthermore, a concatenating precoder may be randomly selected by a UE in a determined time/frequency resource unit or a pre-defined concatenating precoder may be configured or defined on higher layer signaling or a standard. Alternatively, after a plurality of concatenating precoder sets is generated based on concatenating precoder information generated through information (i.e., downlink control information) indicated by a base station, the plurality of concatenating precoder sets may be alternately used in a predetermined time/frequency resource unit.

A base station has multiple panels, and may transmit data to a UE by multiplying corresponding panels by different phases. In this case, the size of a signal and/or a phase distortion level may be different between the panels of the base station depending on an implementation. That is, a DVL value may be defined between downlink antenna ports transmitted in different base station panels, and the value may be different in each base station. This follows the Method 2 without any change, and corresponding contents (i.e., Method 4 to Method 6) are described based on a corresponding method.

If phase values to be applied between panels are different for each UE, the UE may be configured to feedback a phase optimized therefor. In this case, information related to the phase feedback of the UE needs to be defined in DCI for uplink.

Method 4

A base station may notify a UE of whether to feedback phase information through downlink control information (DCI) and/or higher layer signaling (e.g., MAC-CE and/or RRC signaling). In this case, the UE may determine whether to feedback phase information through downlink control information and/or through higher layer signaling.

Method 5

Meanwhile, Method 4 may be extended as follows. A base station may determine its own DVL and notify a UE of the DVL. If the DVL is set to be high (i.e., DVL=high), the UE may assume that it does not perform the feedback of phase information for the base station. In this case, the DVL information may be configured in a cell-specific way. Furthermore, the DVL information may be transmitted through downlink control information and/or higher layer signaling.

In particular, a base station may notify a UE of the number of bits to be used upon phase information feedback through downlink control information and/or higher layer signaling. The UE may determine a level of phase information to be fed back using the number of bits indicated by the base station.

In this case, Method 5 may be performed after Method 4 is performed.

Alternatively, a base station may notify a UE of whether to feedback phase value information between panels to a base station and the number of bits of the feedback with respect at the same time. In this case, if feedback is not permitted, the base station may not define a field that notifies the number of feedback bits. Furthermore, if it is determined that feedback is not permitted, the UE may assume the number of feedback bits to be 0.

Alternatively, regardless of Method 4, a base station may notify a UE of the number of feedback bits for phase value information between base station panels. In this case, Method 5 may operate regardless of Method 4. For example, if the number of feedback bits for phase value information between base station panels is set to 0, a UE may interpret that the feedback of corresponding information is not permitted.

Method 6

Furthermore, a base station may transmit data (i.e., downlink data) through the following method using feedback phase information according to the aforementioned method.

For example, a base station may transmit data while changing and applying a plurality of phase values, generated based on a phase value between panels fed back in a PMI for each panel or a phase compensation value fed back by a UE, every resource element or resource element group. In this case, the base station may separately transmit a demodulation reference signal (DMRS) for each panel to the UE so that panel each channel estimation is possible.

In this case, a DMRS port(s) transmitted in a different panel may be configured for transmission for a different layer(s) (i.e., independent layer joint transmission) or transmission for the same layer(s) (i.e., same layer joint transmission). Alternatively, only some DMRS port(s) may correspond to the same layer(s), and the remaining may be configured for transmission for a different layer(s). Furthermore, the UE may determine a valid channel by applying the phase after estimating the channel of each panel.

For another example, a base station may transmit data while changing and applying phase values between panels feedback in a PMI for each panel every resource block or resource block group.

In the aforementioned methods, the panel may be substituted with an antenna array and/or an antenna port group. In particular, a different base station panel may be extended to a different base station, transmission point (TP) and/or beam.

For example, #0 and #1 among base station panels #0, #1, and #2 may be signals transmitted at a TP # A, and #2 may be a signal transmitted at a TP # B.

Furthermore, panels belonging to the same TP may be mapped to the same CSI-RS resource, and transmit a CSI-RS port(s) to a UE through different antenna port groups. Panels belonging to different TPs may be mapped to different CSI-RS resources.

Alternatively, a different CSI-RS resource is mapped to each panel, and whether it is a CSI-RS transmitted in panels belonging to the same TP may be configured through a separate explicit or implicit indicator. For example, whether a CSI-RS is transmitted in a different panel and/or beam of the same TP or transmitted in a different panel/beam of a different TP may be identified depending on whether a resource QCLed with a corresponding CSI-RS resource(s) is the same synchronization signal (SSB), tracking reference signal (TRS), CSI-RS or a different SSB, TRS or CSI-RS.

If a base station and/or a UE have a multi-panel (i.e., a multi-antenna panels through the aforementioned methods, there have been proposed a method of compensating for a phase and/or gain difference between panels (according to a DVL) and a method of performing DL/UL transmission while cycling the phase and/or gain difference in a specific time and/or frequency resource unit.

In the disclosure, the cycling may mean precoder cycling in which transmission is performed while changing a precoder in a time/frequency resource unit. For example, what transmission is performed while cycling a specific precoder in a time and/or frequency resource unit may mean that transmission is performed while changing a specific precoder in a time and/or frequency resource unit.

Hereinafter, the disclosure proposes a method of configuring and/or indicating a downlink reference signal (e.g., CSI-RS) and/or a method of configuring feedback information related to the downlink reference signal in order to support the aforementioned operations of a base station.

For convenience of description, a time and/or frequency resource unit in which a base station and/or a UE perform transmission while changing precoding is referred to as a precoding resource group (PRG). For example, if cycling is performed every physical resource block (PRB), the aforementioned PRG may correspond to 1 PRB in a frequency axis. Alternatively, if N subcarriers are grouped and a precoder is cycled, the aforementioned PRG may correspond to N subcarriers.

A method proposed in the disclosure may be a method of compensating for and/or incorporating that uncertainty is present in a phase difference and/or gain difference between multi-panels (i.e., a plurality of antenna panels). However, a method proposed in the disclosure may also be identically applied to a situation in which uncertainty is present in a phase difference and/or gain difference between different base stations or transmission points (TPs).

If a base station has multiple panels, the following three methods (hereinafter Methods 1 to 3) may be considered as a corresponding PMI feedback codebook configuration method.

Hereinafter, in the disclosure, for convenience of description, a matrix for compensating for a phase difference and/or gain difference between panels, that is, a matrix for compensating for a phase and/or gain calibration between panels may be referred to as $W_3$. In other words, $W_3$ may mean information regarding how much a phase and/or gain between panels needs to be compensated for. For example, a matrix index related to $W_3$ may be referred to as $I_3$, $I_{3,1}$, $I_{3,2}$, etc. Alternatively, a matrix index corresponding to $W_3$ may be represented as some matrix indices (e.g., $I_{1,4}$, $I_{2,4}$) of $W_1$ and/or $W_2$.

Furthermore, as described above, a matrix for compensating for a phase difference and/or gain difference between panels having a wideband (WB) characteristic may be referred to as $W_1$. A matrix for compensating for a phase difference and/or gain difference between panels having a subband (SB) characteristic may be referred to as $W_2$. In this case, for example, a matrix index related to $W_1$ and $W_2$ may be referred to as $I_{1,1}$, $I_{1,2}$, $I_{2,1}$, $I_{2,2}$, etc.

Method 1

A method of compensating for a phase difference and/or gain difference between panels as a single value with respect to a full bandwidth may be considered. That is, a configuration may be performed so that a phase difference and/or gain difference between panels is compensated for using a matrix (or codebook) for a WB panel compensation. The corresponding method may correspond to a method of configuring a PMI feedback codebook having the attributes of a WB parameter.

In this case, the PMI feedback codebook W may be represented as a $W_3 W_1 W_2$ structure.

Method 2

Alternatively, a method of compensating for a phase difference and/or gain difference between panels every subband configuring a full bandwidth may also be considered. That is, a configuration may be performed so that a phase difference and/or gain difference between panels is compensated for using a matrix (or codebook) for an SB panel compensation. The corresponding method may correspond to a method of configuring a PMI feedback codebook having the attributes of an SB parameter.

In this case, the PMI feedback codebook W may be represented as a $W_1 W_2 W_3$ structure.

Method 3

Alternatively, a method of compensating for a phase difference and/or gain difference between panels by applying both Method 1 and Method 2 may also be considered. That is, a configuration may be performed so that a phase difference and/or gain difference between panels is compensated for using a matrix (or codebook) for a WB panel compensation and a matrix (or codebook) for an SB panel compensation. The corresponding method may correspond to a method of configuring a PMI feedback codebook having the attributes of a WB parameter and an SB parameter.

In this case, the PMI feedback codebook W may be represented as a $W_{3,1} W_1 W_2 W_{3,2}$ structure. In this case, $W_{3,1}$ may mean a matrix for compensating for a phase difference and/or gain difference of a WB characteristic, and $W_{3,2}$ may mean a matrix for compensating for a phase difference and/or gain difference of an SB characteristic.

For example, a configuration may be performed so that after a phase difference and/or gain difference is coarsely corrected (or compensated for) using $N_1$ bit WB parameters, the phase difference and/or gain difference are more precisely corrected (or compensated for) using $N_2$ bit SB parameters.

In this case, feedback having an SB characteristic may be configured as difference value information for feedback having a WB characteristic.

Hereinafter, a CSI reporting (i.e., CSI feedback) method of a UE according to a CSI reporting mode indication of a base station is described in detail. Specifically, a method of determining a matrix index configuring a precoding matrix indicator (PMI) included in CSI and calculating a channel quality indicator (CQI) based on the aforementioned indication of the base station is described.

First Embodiment

First, a base station may perform an indication in a UE so that a matrix index (e.g., $I_{1,1}$, $I_{1,2}$, $I_{2,1}$, $I_{2,2}$) related to $W_1$ and $W_2$ is included in feedback, but a matrix index (e.g., $I_3$, $I_{3,1}$, $I_{3,2}$) related to $W_3$ is excluded from the feedback in the CSI reporting of the UE. For example, such an indication may be referred to as a semi-open-loop MIMO-based CSI reporting method.

In other words, when the base station configures a CSI reporting mode in the UE, it may indicate that the UE should not report an index for a matrix (i.e., $W_3$) for compensating for a phase difference and/or gain difference between panels in a PMI to be fed back. For example, this may be configured so that it is indicated by a specific CSI reporting mode or CSI reporting parameter.

Such an indication may be configured in a UE through higher layer signaling (e.g., MAC-CE and/or RRC signaling) and/or physical layer signaling (e.g., DCI) by a base station.

A UE that has received such an indication may assume a matrix index related to $W_1$ and $W_2$ as a matrix index included in feedback information, may assume a matrix index value related to $W_3$ as a specific matrix index, and may calculate CSI. That is, a UE that has received a corresponding indication does not report a matrix index value related to $W_3$ as feedback information, but may assume and use the matrix index as a specific matrix index when it calculating CSI.

For example, a UE may report CQI within CSI, including a result calculated using a matrix index related to $W_1$ and $W_2$ and a specific matrix index related to $W_3$. In other words, a UE that has received a corresponding indication may be configured to calculate and report CQI by assuming a matrix index (e.g., $I_{1,1}$, $I_{1,2}$, $I_{2,1}$, $I_{2,2}$) related to $W_1$ and $W_2$ as an index included in feedback information and assuming matrix indices (e.g., $I_3$, $I_{3,1}$, $I_{3,2}$) related to $W_3$ as one of the following methods (hereinafter Methods 1 to 3) upon CQI calculation.

That is, a "specific matrix index related to $W_3$" used for the aforementioned CSI calculation (e.g., CQI calculation) may be assumed or determined by one of the following methods.

Method 1

A UE that has received the aforementioned indication from a base station may calculate CSI by assuming a matrix index related to $W_3$ as indices configured and/or indicated by the base station. In this case, the base station may configure and/or indicate the matrix indices through higher layer signaling (e.g., RRC signaling).

For example, a base station may select and designate a specific set (or subset) of matrix indices related to $W_3$, and a UE may perform CSI calculation using the designated matrix index(ices).

In this case, if a plurality of matrix indices for $W_3$ has been configured and/or indicated by the base station, the UE may perform CSI calculation while changing and applying one matrix index in a frequency resource unit configured for the corresponding indices. Alternatively, in this case, the UE may calculate average CSI while applying different $W_3$ based on $W_1$ and $W_2$ calculated for a full frequency band.

Method 2

Alternatively, a UE that has received the aforementioned indication from a base station may calculate CSI by assuming a matrix index related to $W_3$ as a pre-defined index(ices).

For example, the pre-defined index may correspond to the lowest matrix index (e.g., lowest index of $I_3$) of matrix indices related to $W_3$. Alternatively, the pre-defined index may correspond to all matrix indices related to $W_3$ (e.g., all indices of $I_3$).

Method 3

Alternatively, a UE that has received the aforementioned indication from a base station may calculate CSI by assuming a matrix index related to $W_3$ as its selected index(ices). In this case, the UE may randomly select a matrix index(dices) related to $W_3$.

Furthermore, in the application of the aforementioned methods, information related to $W_3$, that is, phase and/or gain difference information between panels, may be divided into wideband (WB) information (e.g., $W_{3,1}$) and subband (SB) information (e.g., $W_{3,2}$), and may be defined or configured. In this case, a UE may report only one of the two pieces of information, and a configuration may be performed so that a pre-defined value, a value defined or configured by a base station, or a value randomly selected by a UE is applied to the remainder. In this case, the base station may configure or indicate that which information will be reported and which information will not be reported.

For example, a UE may be configured to report $W_3$ information having a WB characteristic, but to not feedback $W_3$ information having an SB characteristic. For another example, a UE may be configured to doe not feedback $W_3$ information having a WB characteristic, but feedback $W_3$ information having an SB characteristic.

A UE does not report a specific matrix index (e.g., a matrix index related to $W_3$) through a PMI by comparing a method, such as that described above, with a full open-loop MIMO method or a closed-loop MIMO method, but assumes and applies a corresponding value when calculating CSI. Accordingly, there is an advantage in that more efficient CSI feedback can be performed.

Second Embodiment

In this case, unlike in the aforementioned method of the first embodiment, after a UE selects a preference matrix related to $W_3$, it may select a corresponding matrix index(ices) within a specific range of a phase difference and/or gain difference indicated by the corresponding matrix. Alternatively, after a UE selects a preference matrix related to $W_3$, it may select a matrix index(ices) according to a specific rule or randomly within a specific range of a phase difference and/or gain difference indicated by the corresponding matrix.

Similarly, even in the case of Method 1 of the aforementioned first embodiment, if a UE has selects a preference matrix related to $W_3$, the corresponding UE may select a matrix index(ices) within a phase difference and/or gain difference indicated by the corresponding matrix and a range (according to a specific rule) configured by a base station. Furthermore, even in the case of Method 2 of the aforementioned first embodiment, if a UE has elects a preference matrix related to $W_3$, the corresponding UE may select a matrix index(ices) (according to a specific rule) within a phase difference and/or gain difference indicated by the corresponding matrix 0l indication and a pre-defined range.

This is described in detail below.

If a base station indicates report setting, corresponding to methods (hereinafter Methods 1 to 3) to be described later with respect to a UE, the UE may select preference matrix indices related to $W_1$, $W_2$ and $W_3$ and include them in feedback information.

In this case, the UE may assume or determine a "specific matrix index related to $W_3$", used for CSI calculation (e.g., CQI calculation), based on one of the following methods (hereinafter Methods 1 to 3).

Method 1

$W_3$ related to the aforementioned specific matrix index may be assumed or determined by applying a phase value and/or gain value indicated in $W_3$ selected and/or reported by a UE, a matrix(ces) belonging to a range configured by a base station or a matrix(ces) having difference values set by a base station together.

Method 2

Alternatively, $W_3$ related to the aforementioned specific matrix index may be assumed or determined by applying a phase value and/or gain value indicated in $W_3$ selected and/or reported by a UE and matrices having pre-defined difference values together.

Method 3

Alternatively, $W_3$ related to the aforementioned specific matrix index may be assumed or determined by applying a phase value and/or gain value indicated in $W_3$ selected and/or reported by a UE and an index(ices) selected by the UE. In this case, overhead may increase doe to a plurality of $W_3$ index feedbacks. In order to reduce such feedback overhead, a method of defining a rule or table in which a specific index is mapped to each $W_3$ matrix group and feedbacking the corresponding index may be considered.

A detailed example of the aforementioned method may be as follows.

A base station may enable all preference matrix indices related to $W_1$, $W_2$, and $W_3$ to be fed back. In this case, after the base station that has received corresponding information generates a plurality of values based on a $W_3$ value reported by a UE, it may indicate that the UE should perform CSI calculation by assuming that the UE transmits generated values, while changing a time and/or frequency unit, when transmitting data (e.g., DL-SCH).

For example, if a UE reports that an optimal phase difference value between panels is 30 degrees, a base station may generate values between (30−X) degrees and (30+X) degrees upon data transmission by considering a DVL between panels, and may apply the values while changing them in a time/frequency unit.

In this case, the range (i.e., X value in the example) of the phase difference values between panels or the range of $W_3$ matrix indices to be applied by the base station may be configured by the base station for the CSI calculation of the UE (e.g., Method 1). Alternatively, the range of the phase difference values between panels or the range of the $W_3$ matrix indices to be applied by the base station may be regulated or defined as a specific range (e.g., Method 2). Alternatively, the range of the phase difference values between panels or the range of the $W_3$ matrix indices to be applied by the base station may be applied as a range of the information while the UE feeds back the plurality of phase difference values between panels or the $W_3$ matrix indices (e.g., Method 3).

Third Embodiment

In the case of the aforementioned first embodiment and second embodiment, an operation in which a CSI-RS resource referred for CSI reporting is based on CSI resource setting, a single CSI-RS resource set within CSI-RS resource setting or a single CSI-RS resource may be assumed. However, a CSI-RS resource, a CSI-RS resource set and/or CSI-RS resource setting are separately managed for each panel (or antenna panel or antenna array), but the aforementioned methods of the first embodiment and the second embodiment may be applied upon CSI calculation (e.g., CQI calculation).

In this case, after a base station maps a CSI-RS resource to a UE for each panel (or panel group), it may indicate that the UE should feedback a matrix index related to $W_1$ and $W_2$ for each CSI-RS resource. In this case, the base station may indicate that the UE performs CSI calculation (e.g., CQI calculation) and reporting by assuming the ambiguity of a phase difference and/or a gain difference over a plurality of resources.

For example, a UE may be configured to select a PMI for each CSI-RS resource (or resource group) with respect to a plurality of CSI-RS resources (or resource groups) and to feedback each PMI. Specifically, the corresponding UE may select a PMI corresponding to the same rank indicator (RI) for each CSI-RS resource, and may feedback each PMI and a common RI to a base station.

In this case, in the CSI calculation (e.g., CQI calculation) and reporting of the UE, it may be assumed that a precoder corresponding to the PMI selected by the UE is applied to antenna ports belonging to each CSI-RS resource (or resource group). Furthermore, a concatenating precoder (or compensation precoder) for a phase difference and/or gain difference between antenna port groups belonging to different CSI-RS resources (or resource groups) may be assumed based on one of the following methods (hereinafter Methods 1 to 3).

Method 1

A combining precoder for a phase difference and/or gain difference between antenna port groups belonging to different CSI-RS resources or resource groups may be assumed as a precoder corresponding to an index(ices) configured and/or indicated by a base station. In this case, the base station may configure and/or indicate matrix indices through higher layer signaling (e.g., RRC signaling), etc.

Method 2

Alternatively, a combining precoder for a phase difference and/or gain difference between antenna port groups belonging to different CSI-RS resources or resource groups may be assumed as a precoder corresponding to a pre-defined index(ices).

For example, a pre-defined index may correspond to the lowest matrix index (e.g., lowest index of concatenating matrix) among matrix indices related to a combining precoder. Alternatively, a pre-defined index may correspond to all matrix indices related to a combining precoder (e.g., all indices of concatenating matrix).

Method 3

Alternatively, a combining precoder for a phase difference and/or gain difference between antenna port groups belonging to different CSI-RS resources or resource groups may be assumed as a precoder corresponding to an index(ices) selected by a UE.

In the aforementioned methods, if a PMI selected for each CSI-RS resource is configured and/or defined to have the same RI, a phase difference and/or a gain difference may be compensated for (or corrected) for each layer when the PMIs are combined.

Alternatively, a method of selecting a different RI may also be applied for each CSI-RS resource. In this case, only some layer(s) may be combined between the PMIs, and the remaining layer(s) may not be combined.

Accordingly, if a UE selects and/or reports each RI for each CSI-RS resource, selection and/or reporting information of the UE for a layer group on which combining and/or calibration will be performed and a layer group on which combining and/or calibration will not be performed between CSI-RS resources or indication and/or configuration information of a base station may be additionally signaled.

Fourth Embodiment

Furthermore, as in the aforementioned third embodiment, if a CSI-RS resource, a CSI-RS resource set and/or CSI-RS resource setting are separately managed, a method of the following example may be considered by applying the method of the aforementioned second embodiment.

For example, a UE may be configured to select a PMI for each CSI-RS resource (or resource group) with respect to a plurality of CSI-RS resources (or resource groups) and to feedback each PMI. Specifically, the corresponding UE may select a PMI corresponding to the same rank indicator (RI) for each CSI-RS resource and to feedback each PMI and a common RI to a base station.

Furthermore, the UE may be configured to select and feedback a preference index for a concatenating matrix (i.e., combining precoder) for a phase difference and/or a gain difference within an antenna port group belonging to different CSI-RS resources (or resource groups) (with respect to a specific layer(s)).

In this case, in the CSI calculation (e.g., CQI calculation) and reporting of the UE, it may be assumed that a precoder corresponding to a PMI selected by the UE is applied to antenna ports belonging to each CSI-RS resource (or resource group). Furthermore, a concatenating precoder (or compensation precoder) for a phase difference and/or gain difference between antenna port groups belonging to different CSI-RS resources (or resource groups) may be assumed by considering that the concatenating precoder (or compensation precoder) is changed and applied in a time and/or frequency resource unit based on one of the following methods (hereinafter Methods 1 to 3).

Method 1

A combining precoder for a phase difference and/or gain difference between antenna port groups belonging to different CSI-RS resources or resource groups may be assumed as a precoder(s) corresponding to a combining matrix value or index, selected and reported by a UE, and a value(s) or index(ices) belonging to a range configured and/or indicated by a base station. In this case, the combining matrix value or index selected and reported by the UE may mean a phase value and/or gain value indicated in the combining matrix selected and reported by the UE. In this case, the base station may configure and/or indicate the range of the matrix indices or the range of a phase and/or gain difference through higher layer signaling (e.g., RRC signaling), etc.

Method 2

Alternatively, a combining precoder for a phase difference and/or gain difference between antenna port groups belonging to different CSI-RS resources or resource groups may be assumed as a precoder(s) having a different of a pre-defined value(s) or index(ices) compared to a combining matrix value or index selected and reported by a UE. In this case, the combining matrix value or index selected and reported by the UE may mean a phase value and/or gain value indicated in the combining matrix selected and reported by the UE.

For example, if a pre-defined phase difference value is ±15 degrees, a UE may calculate CQI by assuming that a base station will change and apply a phase by (X±15) degrees based on a phase difference value X degree between antenna port groups belonging to selected and reported different CSI-RS resources (or resource groups).

Method 3

Alternatively, a combining precoder for a phase difference and/or gain difference between antenna port groups belonging to different CSI-RS resources or resource groups may be assumed as a precoder(s) corresponding to an index(ices) selected by a UE. In this case, the UE may feedback a plurality of values to a base station, or may regulate a feedback index corresponding to a specific range and feedback the corresponding index to a base station.

In Methods 1 to 3 of the aforementioned first embodiment to fourth embodiment, if a plurality of matrix indices is configured, indicated, pre-defined or selected, a method of applying, by a UE, each matrix to all band widths in which a CSI-RS is transmitted and then calculating and reporting CSI (e.g., CQI) which may be obtained in average may be considered.

Alternatively, in this case, a method of calculating, by a UE, CSI (e.g., CQI) by alternately applying a matrix index configured and/or indicated for each PRG (according to a specific rule) with respect to a band width in which a CSI-RS is transmitted (divided according to a specific rule or divided based on a configuration of a base station) may also be considered.

In the case of the latter method, a base station may additionally indicate, in the UE, a configuration regarding that CSI will be calculated by applying which precoder (i.e., which precoding index or matrix index) to which PRG set (PRG set) in Method 1 or Method 2 of each embodiment.

Fifth Embodiment

A multi-panel base station (i.e., a base station having multi-antenna panels) may transmit a CSI-RS through a separate CSI-RS port group or CSI-RS resource for each panel (or panel group). In this case, if a total number of CSI-RS ports is many, to select some panels (or panel groups) having excellent quality may be efficient.

For example, a method of selecting some panels or panel groups having excellent quality may be more advantageous in a system operation aspect and/or a PMI feedback accuracy or spatial granularity aspect according to a limited amount of feedback information. In particular, if panels belonging to a plurality of base stations (or TPs) are included in CSI-RS transmission, a UE may be configured to select a base station(s) having excellent quality and to perform transmission (i.e., feedback).

Accordingly, a UE configured and/or indicated with N CSI-RS resources may select M CSI-RS resources of N resources and then apply the aforementioned methods to only CSI-RS antenna ports belonging to the M resources. In this case, M may be set to be smaller than or equal to N.

In this case, a base station may additionally indicate or configure configuration information to be assumed when DVL-related information (i.e., distortion-related information) or CSI (e.g., CQI) is calculated for each CSI-RS resource group with respect to the UE. In this case, the UE may determine whether to apply the methods described in the aforementioned embodiments and which method of the methods will be applied based on the DVL state and/or CSI configuration information (e.g., CQI configuration information) of a selected CSI-RS resource group.

For example, if a CSI-RS resource group selected by a UE has a severe distortion characteristic between devices (e.g., if DVL=high), the UE may be configured to apply the methods described in the first embodiment or the third embodiment. In contrast, if a CSI-RS resource group selected by a UE has a normal distortion characteristic between devices (e.g., if DVL=mid), the UE may be configured to apply the methods described in the second embodiment or fourth embodiment. Furthermore, if a CSI-RS resource group selected by a UE has a small distortion characteristic between devices (e.g., if DVL=low), the UE may be configured to follow a common closed-loop MIMO-based CSI calculation method not the methods described in the aforementioned first embodiment to fourth embodiment. In this case, the common closed-loop MIMO-based CSI calculation method may mean a method of selecting, by a UE, all PMIs and calculating CQI if a corresponding PMI has been applied.

Furthermore, in the aforementioned examples, a method of directly notifying which method will be applied through CSI feedback configuration information for each CSI-RS resource group instead of a DVL may also be considered.

A UE may be configured to select some CSI-RS resource(s) among a plurality of CSI-RS resources configured and/or indicated for CSI measurement as described above and to calculate and report CSI by applying the method of the aforementioned first embodiment to fourth embodiment to the selected CSI-RS resources. In this case, the selected CSI-RS resource(s) may have excellent quality (e.g., a resource having a high RSRP, RSRQ, etc.) among the plurality of CSI-RS resources.

That is, although a base station configures a plurality of CSI-RS resources, the UE may autonomously select only some CSI-RS resources and perform CSI measurement. In this case, the index(ices) of the CSI-RS resource selected by the UE may be included in feedback information (i.e., CSI reporting).

Furthermore, in this case, the base station may additionally configure distortion-related information (i.e., DVL-related information) for a CSI-RS resource group, configuration information for CSI calculation and/or reporting, etc. Accordingly, the UE may determine whether to apply the aforementioned first embodiment to fourth embodiment and that a method of which embodiment will be applied based on the DVL state of a selected CSI-RS resource group or a configuration related to CQI reporting.

Alternatively, unlike in the aforementioned method, a base station may indicate the selection of M CSI-RS resources for a UE. This may be performed through higher layer signaling (e.g., RRC signaling) and/or lower layer signaling (e.g., DCI).

In other words, the base station may configure N CSI-RS resources for the UE in advance, and may indicate that the UE should dynamically select M resources of the N CSI-RS resources and perform feedback. For example, a base station may configure 8 CSI-RS resources for a UE in advance through higher layer signaling (e.g., RRC signaling), and may indicate that the UE should select 3 of the 8 CSI-RS resources through lower layer signaling (e.g., MAC-CE, DCI).

If the method described in the fifth embodiment is used, there is an effect in that complexity or overhead related to the CSI reporting of a UE can be reduced because CSI measurement can be performed using only some CSI-RS resource(s) satisfying a specific condition (e.g., quality condition) among configured or indicated CSI-RS resources.

Furthermore, in the aforementioned embodiments of the disclosure, if a UE selects a rank 2 or more (i.e., if a plurality of layers is selected), the aforementioned methods may be applied for each layer or may be applied to all the layers in common. For example, in Method 1 of the aforementioned second embodiment or fourth embodiment, a method of configuring, by a base station, the range of a phase difference and/or gain difference for each layer or the range for all the layers in common may be applied.

FIG. 12 illustrates an example of an operation flowchart of a UE reporting channel state information (CSI) in a wireless communication system to which a method proposed in the disclosure may be applied. FIG. 12 is merely for convenience of description and does not restrict the scope of the disclosure.

Referring to FIG. 12, it is assumed that the UE performs CSI-RS measurement or CSI calculation and reporting based on the methods described in the aforementioned embodiments of the disclosure (e.g., the methods of the first embodiment and the fifth embodiment).

First, the UE may measure a CSI-RS transmitted through multi-panels by a base station (step S1205). For example, the CSI-RS measurement may be performed on a CSI-RS resource(s), configured or indicated by the base station, or a CSI-RS resource(s), selected by the UE, among the CSI-RS resource(s) as described above.

Thereafter, the UE may report the generated CSI to the base station based on the aforementioned CSI-RS measurement (step S1210). For example, the CSI may include a PMI, CQI, an RI, etc. as described above.

In this case, the UE may be configured with CSI reporting excluding a matrix index for a phase calibration between panels (e.g., $I_3$, $I_{3,1}$, $I_{3,2}$, $I_{1,4}$, $I_{2,4}$, etc. related to $W_3$) from the base station. For example, as in the aforementioned method (the method of the first embodiment), the UE may be indicated with a reporting mode in which a matrix index for a phase calibration between panels is not reported as a PMI.

In this case, the CSI reported by the UE may include only a first matrix index (e.g., $I_{1,1}$, $I_{1,2}$, etc.) for a WB panel compensation and a second matrix index (e.g., $I_{2,1}$, $I_{2,2}$, etc.) for an SB panel compensation. Furthermore, the CSI (e.g., CQI within the CSI) reported by the UE may be calculated using the first matrix index, the second matrix index, and a specific matrix index related to phase calibration between panels.

In this case, the first matrix index and/or the second matrix index may be included and reported in a PMI within the CSI. Furthermore, a result calculated using the first matrix index, the second matrix index, and the specific matrix index related to the phase calibration between panels may be included and reported in CQI within the CSI.

For example, as in the aforementioned method, the specific matrix index may have been indicated by the base station through higher layer signaling or may belong to a matrix index set configured by the base station through higher layer signaling. Alternatively, the specific matrix index may correspond to the lowest matrix index among matrix indices pre-configured in relation to the phase calibration between panels or may correspond to all matrix indices pre-configured in relation to the phase calibration between panels. Alternatively, the specific matrix index may correspond to a matrix index randomly selected by the UE, among matrix indices related to the phase calibration between panels.

Overview of Apparatus to which the Disclosure May be Applied

FIG. 13 illustrates a block diagram of a wireless communication device according to an embodiment of the disclosure.

Referring to FIG. 13, a wireless communication system includes a base station (or network) 1310 and a UE 1320.

The base station 1310 includes a processor 1311, a memory 1312 and a communication module 1313.

The processor 1311 implements the function, process and/or method proposed in FIGS. 1 to 12. The layers of a radio interface protocol may be implemented by the processor 1311. The memory 1312 is connected to the processor 1311, and stores various pieces of information for driving the processor 1311. The communication module 1313 is connected to the processor 1311, and transmits and/or receives a radio signal.

The communication module 1313 may include a radio frequency (RF) unit for transmitting and receiving radio signals.

The UE 1320 includes a processor 1321, a memory 1322 and a communication module (or RF unit) 1323. The processor 1321 implements the function, process and/or method proposed in FIGS. 1 to 12. The layers of a radio interface protocol may be implemented by the processor 1321. The memory 1322 is connected to the processor 1321, and stores various pieces of information for driving the processor 1321. The communication module 1323 is connected to the processor 1321, and transmits and/or receives a radio signal.

The memory 1312, 1322 may be positioned inside or outside the processor 1311, 1321 and may be connected to the processor 1311, 1321 by various well-known means.

Furthermore, the base station 1310 and/or the UE 1320 may have a single antenna or multiple antennas.

FIG. 14 illustrates a block diagram of a communication device according to an embodiment of the disclosure.

Particularly, FIG. 14 is a diagram illustrating the UE of FIG. 13 more specifically.

Referring to FIG. 14, the UE may include a processor (or digital signal processor (DSP)) 1410, an RF module (or RF unit) 1435, a power management module 1405, an antenna 1440, a battery 1455, a display 1415, a keypad 1420, a memory 1430, a subscriber identification module (SIM) card 1425 (this element is optional), a speaker 1445, and a microphone 1450. Furthermore, the UE may include a single antenna or multiple antennas.

The processor 1410 implements the function, process and/or method proposed in FIGS. 1 to 12. The layers of a radio interface protocol may be implemented by the processor 1410.

The memory 1430 is connected to the processor 1410, and stores information related to the operation of the processor 1410. The memory 1430 may be positioned inside or outside the processor 1410 and may be connected to the processor 1410 by various well-known means.

A user inputs command information, such as a telephone number, by pressing (or touching) a button of the keypad 1420 or through voice activation using the microphone 1450, for example. The processor 1410 receives such command information and performs processing so that a proper function, such as making a phone call to the telephone number, is performed. Operational data may be extracted from the SIM card 1425 or the memory 1430. Furthermore, the processor 1410 may display command information or driving information on the display 1415 for user recognition or convenience.

The RF module 1435 is connected to the processor 1410 and transmits and/or receives RF signals. The processor 1410 delivers command information to the RF module 1435 so that the RF module 1435 transmits a radio signal that forms voice communication data, for example, in order to initiate communication. The RF module 1435 includes a receiver and a transmitter in order to receive and transmit radio signals. The antenna 1440 functions to transmit and receive radio signals. When a radio signal is received, the RF module 1435 delivers the radio signal so that it is processed by the processor 1410, and may convert the signal into a baseband. The processed signal may be converted into audible or readable information output through the speaker 1445.

The aforementioned embodiments are achieved by a combination of structural elements and features of the disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the disclosure. The order of operations described in the embodiments of the disclosure may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the disclosure may be achieved by various means, for example, hardware, firmware, software, or a combination thereof. In an implementation by hardware, the methods according to the embodiments of the disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiments of the disclosure may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations may be made in the disclosure without departing from the spirit or scope of the disclosures. Thus, it is intended that the disclosure covers the modifications and variations of this disclosure provided they come within the scope of the appended claims and their equivalents.

INDUSTRIAL APPLICABILITY

Although the method for transmitting and receiving an uplink channel in a wireless communication system of the disclosure has been described based on an example in which the method is applied to the 3GPP LTE/LTE-A system and 5G, it may be applied to various wireless communication systems in addition to the 3GPP LTE/LTE-A system and 5G.

The invention claimed is:

1. A method of reporting, by a user equipment, channel state information (CSI) in a wireless communication system, the method comprising:
    measuring a CSI-reference signal (RS) transmitted through multi-panels from a base station, and
    reporting, to the base station, CSI generated based on the CSI-RS measurement,
    wherein, based on the user equipment being configured with CSI reporting excluding a matrix index for a phase calibration between panels from the base station, codebook indices in the reported CSI comprise only a first matrix index for a wideband (WB) panel compensation and a second matrix index for a subband (SB) panel compensation without any matrix index for the phase calibration between panels, and the reported CSI is calculated using the first matrix index, the second matrix index, and at least one specific matrix index related to the phase calibration between panels.

2. The method of claim 1,
    wherein the codebook indices are included in a precoding matrix indicator (PMI) within the CSI and reported.

3. The method of claim 2,
    wherein a result calculated using the first matrix index, the second matrix index, and the at least one specific matrix index related to the phase calibration between panels is included in a channel quality indicator (CQI) within the CSI and reported.

4. The method of claim 3,
    wherein the at least one specific matrix index is indicated by the base station through higher layer signaling.

5. The method of claim 3,
    wherein the at least one specific matrix index belongs to a matrix index set configured by the base station through higher layer signaling.

6. The method of claim 5,
    wherein, based on a plurality of specific matrix indices are configured by the base station, the CSI is calculated based on applying one specific matrix index among the plurality of specific matrix indices in a frequency resource unit related to the one specific matrix index, or the CSI is calculated based on averaging results of applying the plurality of specific matrix indices for a full frequency band.

7. The method of claim 3,
    wherein, based on the at least one specific matrix index including one specific matrix index, the one specific matrix index is related to a lowest matrix index among matrix indices pre-configured in relation to the phase calibration between panels.

8. The method of claim 3,
    wherein the at least one specific matrix index is related to all matrix indices pre-configured in relation to the phase calibration between panels.

9. The method of claim 3,
    wherein the at least one specific matrix index is related to at least one matrix index, randomly selected by the user equipment, among matrix indices related to the phase calibration between panels.

10. The method of claim 3,
wherein the CSI-RS measurement is performed on at least one CSI-RS resource, selected by the user equipment, among CSI-RS resources configured by the base station.

11. The method of claim 10,
wherein the CSI further comprises an index for the at least one CSI-RS resource.

12. A user equipment configured to report channel state information (CSI) in a wireless communication system, the user equipment comprising:
- a radio frequency (RF) unit for transmitting and receiving wireless signals, and
- a processor controlling the RF unit,
- wherein the processor is configured to:
- measure a CSI-reference signal (RS) transmitted through multi-panels from a base station, and
- report, to the base station, CSI generated based on the CSI-RS measurement,
- wherein based on the user equipment being configured with CSI reporting excluding a matrix index for a phase calibration between panels from the base station, codebook indices in the reported CSI comprise only a first matrix index for a wideband (WB,) panel compensation and a second matrix index for a subband (SB) panel compensation without any matrix index for the phase calibration between panels, and the reported CSI is calculated using the first matrix index, the second matrix index, and at least one specific matrix index related to the phase calibration between panels.

13. The user equipment of claim 12,
wherein the codebook indices are included in a precoding matrix indicator (PMI) within the CSI and reported.

14. The user equipment of claim 13,
wherein a result calculated using the first matrix index, the second matrix index, and the at least one specific matrix index related to the phase calibration between panels is included in a channel quality indicator (CQI) within the CSI and reported.

* * * * *